United States Patent
Woerner et al.

(10) Patent No.: US 10,810,665 B2
(45) Date of Patent: Oct. 20, 2020

(54) QUANTUM CIRCUIT RISK ANALYSIS

(71) Applicant: International Business Machines Corporation, Armonk, NY (US)

(72) Inventors: Stefan Woerner, Zürich (CH); Daniel Josef Egger, Zürich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 212 days.

(21) Appl. No.: 16/004,649

(22) Filed: Jun. 11, 2018

(65) Prior Publication Data

US 2019/0378208 A1    Dec. 12, 2019

(51) Int. Cl.
G06Q 40/02 (2012.01)
G06N 10/00 (2019.01)
G06N 7/00 (2006.01)

(52) U.S. Cl.
CPC ........... *G06Q 40/025* (2013.01); *G06N 7/005* (2013.01); *G06N 10/00* (2019.01)

(58) Field of Classification Search
CPC ....... G06Q 40/025; G06N 10/00; G06N 7/005
See application file for complete search history.

(56) References Cited

U.S. PATENT DOCUMENTS

| | | | |
|---|---|---|---|
| 2005/0177485 A1 | 8/2005 | Peter | |
| 2006/0047561 A1 | 3/2006 | Bolton | |
| 2010/0042553 A1 | 2/2010 | Van Erlach | |
| 2014/0310071 A1 | 10/2014 | Conradson et al. | |
| 2015/0221040 A1 | 8/2015 | Strauss et al. | |
| 2017/0220948 A1* | 8/2017 | Bocharov | G06F 17/10 |
| 2018/0232649 A1* | 8/2018 | Wiebe | G06N 10/00 |

FOREIGN PATENT DOCUMENTS

| | | |
|---|---|---|
| WO | 02097574 A2 | 12/2002 |
| WO | 2015/188025 A1 | 12/2015 |

OTHER PUBLICATIONS

Goncalves, "Quantum Financial Economics of Games, Strategies and Financial Decisions", J. Systems Sci. and Complexity 26, Apr. 2013, pp. 187-200 (Year: 2013).*

(Continued)

*Primary Examiner* — Scott C Anderson
(74) *Attorney, Agent, or Firm* — Amin, Turocy & Watson, LLP

(57) ABSTRACT

The technology described herein is directed towards quantum circuits used to analyze risk, including expected value, variance, value at risk and conditional value at risk metrics. Aspects can comprise modeling uncertainty of one or more random variables to provide a first quantum sub-circuit by mapping the one or more variables to quantum states represented by a selected number of qubits using quantum gates, and encoding a risk metric into a second quantum sub-circuit, the second quantum sub-circuit comprising a first ancilla qubit and Y-rotations controlled by one or more other qubits. Further aspects can comprise performing amplitude estimation based on the first sub-circuit and the second sub-circuit to extract a probability value corresponding to the risk metric, wherein the probability value represents a probability of measuring a one state in the ancilla qubit.

25 Claims, 19 Drawing Sheets

(56) References Cited

OTHER PUBLICATIONS

Arslan et al., "A Study on the Use of Quantum Computers, Risk Assessment and Security Problems", 6th Int'l. Symposium on Digital Forensics and Security, Mar. 2018 (Year: 2018).*
Meyer, "Extending and Simulating the Quantum Binomial Options Pricing Model", submitted as a thesis for the degree of M.S. in Comp. Sci., University of Manitoba—Winnipeg, Jan. 2009 (Year: 2009).*
Rebentrost, et al., "Quantum computational finance: Monte Carlo pricing of financial derivatives," arXiv:1805.00109v1 [quant-ph] Apr. 30, 2018, 16 pages.
Brassard, et al., "Quantum Amplitude Amplification and Estimation," arXiv:quant-ph/0005055v1 May 15, 2000, 32 pages.
Kountzakis, et al., "On Quantum Risk Modelling," Last Accessed: Jun. 8, 2018, 7 pages.
Garcia, et al., "Risk-Cost Frontier and Collateral Valuation in Securities Settlement Systems for Extreme Market Events," Feb. 2006, 48 pages.
Black, et al., "The Pricing of Options and Corporate Liabilities," vol. 81, No. 3 (May-Jun. 1973), 19 pages.
Kitaev, "Quantum measurements and the Abelian Stabilizer Problem," arXiv:quant-ph/9511026v1 Nov. 20, 1995, 22 pages.
Abrams, et al., "Fast quantum algorithms for numerical integrals and stochastic processes," arXiv:quant-ph/9908083v1 Aug. 28, 1999, 15 pages.
Montanaro, "Quantum speedup of Monte Carlo methods," ArXiv:1504.06987v3 [quant-ph] Jul. 11, 2017, 28 pages.
Grover, et al., "Creating superpositions that correspond to efficiently inte grable probability distributions," arXiv: quant-ph/0208112v1 Aug. 15, 2002, 2 pages.
Vedral, et al., "Quantum Networks for Elementary Arithmetic Operations," aarXiv:quant-ph/9511018v1 Nov. 16, 1995, 12 pages.
Draper, "Addition on a Quantum Computer," arXiv:quant-ph/0008033v1 Aug. 7, 2000, 8 pages.
Cuccaro, "A new quantum ripple-carry addition circuit," arXiv:quant-ph/0410184v1 Oct. 22, 2004, 9 pages.
Draper, et al., "A Logarithmic-Depth Quantum Carry-Lookahead Adder," arXiv:quant-ph/0406142v1 Jun. 20, 2004, 21 pages.
Bhaskar, et al., "Quantum Algorithms and Circuits for Scientific Computing," arXiv:1511.08253v1 [quant-ph] Nov. 25, 2015, 43 pages.
Green, et al., "Quipper: A Scalable Quantum Programming Language," arXiv:1304.3390v1 [cs.PL] Apr. 11, 2013, 10 pages.
Green, et al., "An Introduction to Quantum Programming in Quipper," arXiv:1304.5485v1 [cs.PL] Apr. 19, 2013, 15 pages.
Barenco, et al., "Elementary gates for quantum computation," arXiv:quant-ph/9503016v1 Mar. 23, 1995, 31 pages.
Trefethen, "Approximation Theory and Approximation Practice," Last Accessed: Jun. 8, 2018, 48 pages.
Black, et al., "A One-Factor Model of Interest Rates and Its Application," Financial Analysts Journal; Jan./Feb. 1990; 46, 7 pages.
github.com, "IBM Q 5 Yorktown V1.x.x," Last Accessed: Jun. 8, 2018, 5 pages.
Nippani, et al., "Are Treasury Securities Free of Default?," The Journal of Financial and Quantitative Analysis, vol. 36, No. 2, Special Issue on International Corporate Governance. (Jun. 2001), pp. 251-265.
Vanneram, et al., "Assessing Interest Rate Risk Beyond Duration—Shift, Twist, Butterfly," Apr. 2010, 26 pages.
Sheldon, et al., "Procedure for systematically tuning up cross-talk in the cross-resonance gate," ArXiv:1603.04821v1 [quant-ph] Mar. 15, 2016, 6 pages.
quantumexperience.ng.bluemix.net, "IBM Q > Experience ," Last Accessed: Jun. 8, 2018, 4 pages.
qiskit.org, "QISKit," Last Accessed: Jun. 8, 2018, 1 page.
Dobsicek, et al., "Arbitrary accuracy iterative phase estimation algorithm a s a two qubit benchmark," arXiv:quant-ph/0610214v3 Jul. 12, 2007, 4 pages.
O'Loan, "Iterative phase estimation," arXiv:0904.3426v2 [quant-ph] Jan. 22, 2010, 17 pages.
Svore, et al., "Faster Phase Estimation," Last Accessed: Jun. 8, 2018, 14 pages.
Barkoutsos, et al., "Quantum algorithms for electronic structure calculations: particle/hole Hamiltonian and optimized wavefunction expansions," arXiv:1805.04340v1 [quant-ph] May 11, 2018, 14 pages.
Kandala, et al., "Extending the computational reach of a noisy superconducting quantum processor," arXiv:1805.04492v1 [quant-ph] May 11, 2018, 10 pages.
Tokdar, et al., "Importance Sampling: A Review," Last Accessed: Jun. 8, 2018, 11 pages.
treasury.gov, "Daily Treasury Yield Curve Rates," Last Accessed: Jun. 8, 2018, 11 pages.
International Search Report and Written Opinion received for PCT Application Serial No. PCT/EP2019/065086 dated Sep. 11, 2019, 18 pages.
Rebentrost et al., "Quantum computational finance: Monte Carlo pricing of financial derivatives", Apr. 30, 2018, pp. 1-17.
Montanaro Ashley, "Quantum speedup of Monte Carlo methods", Jul. 12, 2017, 28 pages.
Knill et al., "Optimal quantum measurements of expectation values of observables", Physical Review A 75, vol. 75, No. 1, Jan. 24, 2007, 13 pages.
Glasserman, et al, "Efficient Monte Carlo methods for value-at-risk Mastering Risk," Sep. 10, 2000, 14 pages.
Basel Committee on Banking Supervision, "Enhancements to the Basel II framework ," Jul. 13, 2009, 41 pages.
Nielsen, et al., "Quantum Computation and Quantum Information," Oct. 23, 2000, 698 pages.
Treasurydirect.Gov, "Monthly statment of the public debt of the united states," Dec. 1, 2017, 1 page.
Newyorkfed.Org, "US Treasury Trading Volume," Jun. 8, 2018, 1 page.
Newyorkfed.Org, "Federal reserve collat- eral guidelines," Jun. 8, 2018, 2 pages.
Colin, et al., "A Brinson Model Alternative: an Equity Attribution Model with Orthogonal Risk Contributions," The Journal of Performance Measurement, Oct. 1, 2007, 5 pages.
Martellini, et al., "Fixed-Income Securities," Jul. 9, 2003, 664 pages.
Gustavsson, et al., "Improving Quantum Gate Fidelities by Using a Qubit to Measure Microwave Pulse Distortions," PRL 110, 040502 Nov. 9, 2012, 5 pages.
Rigetti, et al., "Fully microwave-tunable universal gates in superconducting qubits with linear couplings and fixed transition frequencies," Physical Review B 81, 134507 Apr. 5, 2010, 7 pages.
Sjoqvist, et al., "Non-adiabatic holonomic quantum computation," Jul. 26, 2011, New J. Phys.14 103035, 11 pages.

* cited by examiner

QUANTUM CIRCUIT RISK ANALYSIS

BACKGROUND

The subject disclosure relates to quantum computing, and more specifically, to estimating risk (e.g., financial risk) with quantum circuits. Risk management plays a significant role in the financial system. For example, value at risk, a quantile of the loss distribution, is a widely used risk metric. Regulations require banks to perform stress tests using value at risk, and also for the calculation of haircuts (the difference between loan collateral and the amount of a loan) applied to collateral used in security settlement systems. Another risk metric is conditional value at risk (sometimes called expected shortfall), defined as the expected loss for losses greater than value at risk.

At present, Monte Carlo simulations run on conventional computer systems are used to determine value at risk and conditional value at risk of a portfolio. Monte Carlo simulations are performed by building a model of the portfolio assets and computing the aggregated value for M different realizations (samples) of the model input parameters. Value at risk calculations using Monte Carlo simulations are computationally intensive, because the width of the confidence interval scales as $O(M^{-1/2})$. Many different runs are needed to achieve a representative distribution of a portfolio's value, and can, for example need overnight processing to achieve the estimates.

Quantum computers exhibit the promise of solving many problems more efficiently than classical algorithms. For example, amplitude estimation is a quantum algorithm used to estimate an unknown parameter and converges as $O(M^{-1})$, which is a quadratic speedup over classical algorithms like Monte Carlo.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later.

According to an embodiment, a system can comprise an uncertainty modeling component that models uncertainty of one or more random variables to provide a first quantum sub-circuit by mapping the one or more variables to quantum states represented by a selected number of qubits using quantum gates. The system can further comprise a risk metric encoding component that encodes a risk metric into a second quantum sub-circuit, the second quantum sub-circuit comprising a first ancilla qubit and Y-rotations controlled by one or more other qubits, and an amplitude estimation component that performs amplitude estimation based on the first sub-circuit and the second sub-circuit to extract a probability value corresponding to the risk metric, wherein the probability value represents a probability of measuring a one state in the ancilla qubit. The technology, based on quantum states, provides a quadratic or near quadratic speed-up compared to conventional Monte Carlo methods.

The risk metric encoding component can approximate the second sub-circuit using multi-controlled qubit rotations with rotation angles corresponding to polynomials to determine the risk metric as an expected value, a variance value, a value at risk quantity and/or conditional value at risk quantity. This provides a quadratic speed-up for value at risk; and, for the expectation value, the variance value, and/or conditional value at risk quantity, provides the ability to tradeoff a speedup between $O(M^{-2/3})$ and $O(M^{-1})$, based on a selected circuit depth, where M corresponds to the number of samples.

According to another embodiment, a computer-implemented method is provided. The computer-implemented method can comprise modeling, by a device operatively coupled to a processor, uncertainty of one or more random variables to provide a first quantum sub-circuit by mapping the one or more variables to quantum states represented by a selected number of qubits using quantum gates, and encoding, by the device, a risk metric into a second quantum sub-circuit, the second quantum sub-circuit comprising a first ancilla qubit and Y-rotations controlled by one or more other qubits. The method can further comprise performing, by the device, amplitude estimation based on the first sub-circuit and the second sub-circuit to extract a probability value corresponding to the risk metric, wherein the probability value represents a probability of measuring a one state in the ancilla qubit. Advantages via amplitude estimation using a quantum algorithm include converging at up to a quadratic speed-up over classical algorithms like Monte Carlo.

The method can further comprise determining a polynomial function, with multi-controlled qubit rotations with rotation angles corresponding to the polynomial function, and mapping the polynomial function to the second quantum sub-circuit. Advantages include that the degree of the polynomial function can be user-selected, thereby allowing a user to trade-off between a desired circuit depth or a desired convergence rate.

According to yet another embodiment, a computer program product can be provided that facilitates estimating a risk analysis result for a risk analysis metric. The computer program product can comprise a computer readable storage medium having program instructions embodied therewith, the program instructions executable by a processor to cause the processor to model uncertainty of one or more random variables to provide a first quantum sub-circuit by mapping the one or more variables to quantum states represented by a selected number of qubits using quantum gates. Further instructions can be executable by the processor to cause the processor to encode a risk metric into a second quantum sub-circuit, the second quantum sub-circuit comprising a first ancilla qubit and Y-rotations controlled by one or more other qubits, and perform amplitude estimation based on the first sub-circuit and the second sub-circuit to extract a probability value corresponding to the risk metric, wherein the probability value represents a probability of measuring a one state in the ancilla qubit.

The ancilla qubit can comprise a first ancilla qubit, and the risk metric can comprise a conditional value at risk quantity, and further instructions can cause the processor to estimate the conditional value at risk quantity by adding a second ancilla qubit to the second sub-circuit, and controlling an operator that acts on the other qubits and the second ancilla qubit. An advantage is that conditional value at risk can be obtained via quantum circuits, which is much faster than conventional computations.

According to another embodiment, a computer-implemented method is provided. The method can comprise providing, by a device operatively coupled to a processor, a first quantum sub-circuit that models uncertainty of one or more random variables by mapping the one or more variables to quantum states represented by a selected number of qubits using quantum gates. The method can further comprise constructing, by the device, a second quantum sub-circuit comprising quantum gates and a first ancilla qubit, the constructing comprising, determining a polynomial function with multi-controlled qubit rotations with rotation angles corresponding to the polynomial function, and mapping the polynomial function to Y-rotation components of the second quantum sub-circuit. The method can further comprise estimating, by the device, a risk metric quantity, comprising applying Y-rotations to the gates of the second quantum sub-circuit, determining an estimated probability value of measuring a one state in the first ancilla qubit, and determining the risk metric based on the estimated probability value. The technology, based on quantum states, provides up to a quadratic speed-up compared to conventional Monte Carlo methods.

According to yet another embodiment, a computer program product facilitating estimating a risk analysis quantity for a risk analysis metric can be provided. The computer program product can comprise a computer readable storage medium having program instructions embodied therewith, the program instructions executable by a processor to cause the processor to provide a first quantum sub-circuit that models uncertainty of one or more random variables by mapping the one or more variables to quantum states represented by a selected number of qubits using quantum gates, and construct a second quantum sub-circuit comprising quantum gates and a first ancilla qubit, comprising determining a polynomial function with multi-controlled qubit rotations with rotation angles corresponding to the polynomial function, and mapping the polynomial function to Y-rotation components of the second quantum sub-circuit. Further instructions can cause the processor to estimate a risk metric quantity, comprising applying Y-rotations to the quantum gates of the second quantum sub-circuit, determining an estimated probability value of measuring a one state in the first ancilla qubit, and determining the risk metric based on the estimated probability value. The technology, based on quantum computing, provides up to a quadratic speed-up compared to conventional Monte Carlo methods.

DETAILED DESCRIPTION

Figure 1:
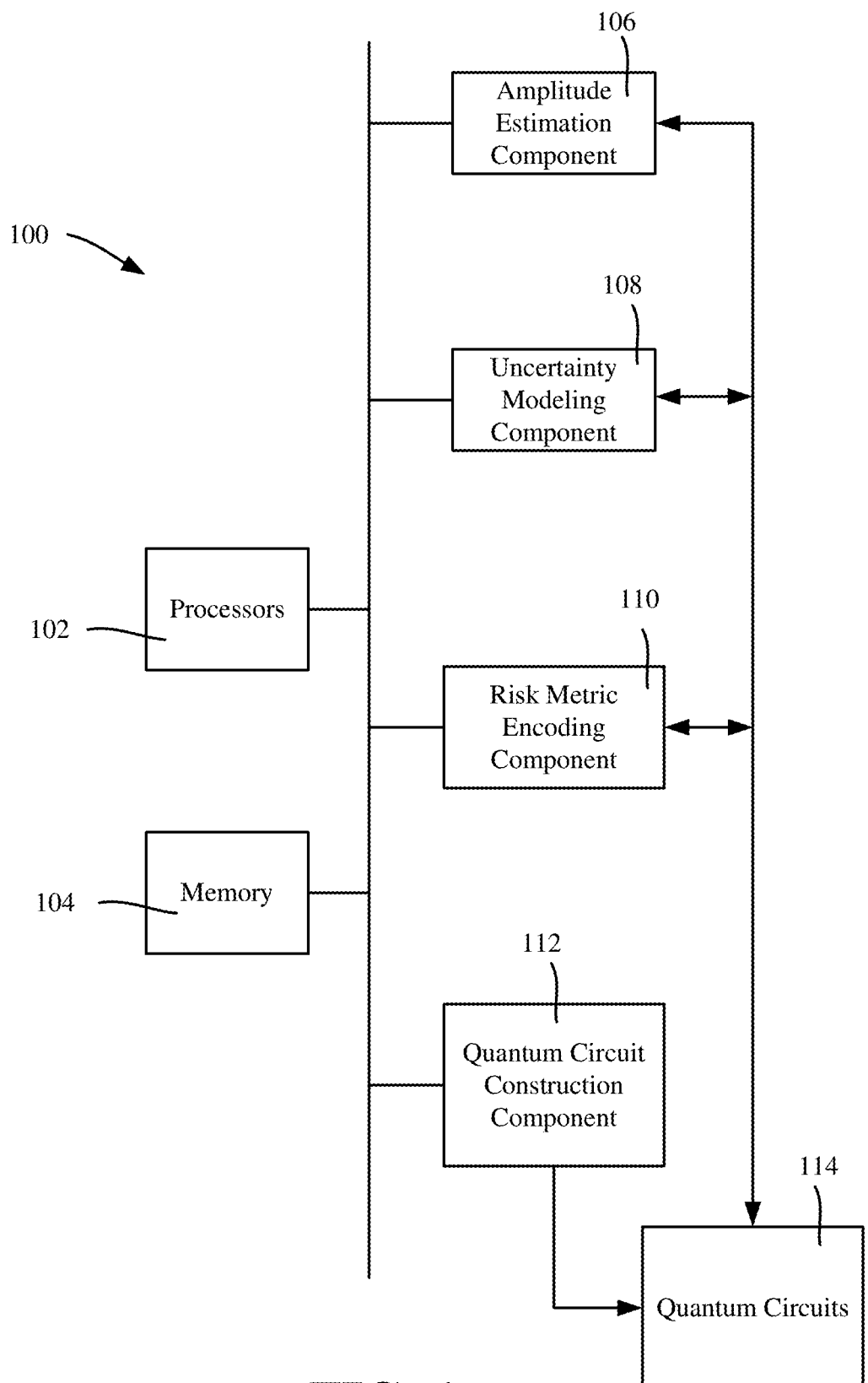
FIG. 1 is a block diagram of an example, non-limiting system that illustrates various aspects of the technology in accordance with one or more embodiments described herein.

The following detailed description is merely illustrative and is not intended to limit embodiments and/or application or uses of embodiments. Furthermore, there is no intention to be bound by any expressed or implied information presented in the preceding sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Further, it is to be understood that the present disclosure will be described in terms of a given illustrative architecture; however, other architectures, structures, substrate materials and process features, and steps can be varied within the scope of the present disclosure.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment," as well any other variations, appearing in various places throughout the specification are not necessarily all referring to the same embodiment. Repetitive description of like elements employed in respective embodiments is omitted for sake of brevity.

In general, a problem is that risk analysis needs to be performed for financial purposes, including for financial institutions to comply with regulations; however the current technology of Monte Carlo simulations is computationally expensive, sometimes requiring overnight computational runs to compute the estimate to within the acceptable amount of error. Getting within the error is an exponential problem, corresponding to the inverse of the square root of the number of samples. A solution described herein is to use a quantum circuit approach. With this approach, the error scales inversely proportional to the number of samples, which is a quadratic speedup relative to the conventional Monte Carlo approach.

Thus, the technology described herein is directed towards performing risk analysis using quantum computing. In general, a quantum computer employs quantum bits (qubits) to encode information, where qubits are basic units of quantum information. Quantum circuits are based on quantum-mechanical phenomena, such as quantum bit superposition and entanglement of qubits.

Described herein is using a quantum circuit that is configured to implement a quantum algorithm that analyzes risk. As will be understood, the use of quantum circuits provides risk analysis significantly more efficiently than Monte Carlo simulations that are traditionally used on classical computers.

FIG. 1 illustrates an example, general framework directed towards a system 100 that uses quantum circuits to estimate quantities related to risk analysis metrics. The system 100 can comprise a processor 102 and memory 104, coupled to an amplitude estimation component 102 that in general performs quantum amplitude estimation, and an uncertainty modeling component 104 that maps a loss/profit random variable to quantum states, and which can be used as part of determining risk estimates as described herein. A risk estimation component 106 is configured to use information from the amplitude estimation component 102 and the uncertainty modeling component 104 to produce the desired risk estimate (quantity). These components can use a quantum circuit construction component 112 to arrange gates and ancilla qubits to provide quantum circuits 114 as described herein.

Loading of uncertainty by the modeling component 104 can be represented as $R|0\rangle \rightarrow |=|\psi\rangle = \Sigma_{x=0}^{2^n-1} \sqrt{p_x}|x\rangle$, where the R operator represents a first sub-circuit that can be used by quantum amplitude estimation one or more times. The risk estimation component 106 performs quantum encoding of a risk metric in amplitude of an ancilla qubit via a proper choice of a function $f$. This results in another operator/sub-circuit F that for all $|x\rangle$ acts as $|x\rangle|0\rangle \rightarrow |x\rangle(\sqrt{1-f(x)}|0\rangle + \sqrt{f(x)}|1\rangle)$. The amplitude estimation component 102 uses amplitude estimation to extract the probability of the ancilla qubit being in state $|1\rangle$ for the state $A|0\rangle$, which corresponds to the risk metric encoded in F. A=FR is obtained by combining the sub-circuits as described herein.

In one aspect, quantum amplitude estimation is implemented on a gate-based quantum computer, to evaluate risk measures such as Expected Value, Variance, Value at Risk and Conditional Value at Risk. Further described herein is how to trade off the convergence rate of the quantum amplitude estimation (algorithm) for shorter circuit depth. Note that the shortest possible circuit depth (growing polynomially in the number of state qubits) leads to a convergence rate of $O(M^{-2/3})$, which is already faster than classical Monte Carlo simulations which converge at a rate of $O(M^{-1/2})$. If the circuit depth is allowed to grow faster, but still polynomially, the convergence rate quickly approaches the optimum of $O(M^{-1})$. Thus, even with slowly increasing circuit depths, the technology described herein provides a near quadratic speed-up relative to Monte Carlo methods.

In general, amplitude estimation can be used to estimate properties of random distributions. Consider a unitary operator $\mathcal{A}$ acting on a register of (n+1) qubits such that $\mathcal{A}|0\rangle_{n+1} = \sqrt{1-a}|\psi_0\rangle_n|0\rangle + \sqrt{a}|\psi_1\rangle_n|1\rangle$ for some normalized states $|\psi_0\rangle_n$ and $|\psi_1\rangle_n$ where $a\in[0,1]$ is unknown. The states $|\psi_0\rangle_n$ and $|\psi_1\rangle_n$ reflect the uncertainty and state of the considered system, whereas the amplitude of the last qubit is used to encode the risk metric of interest. Amplitude estimation provides for the efficient estimation of $a$, i.e., the probability to measure $|1\rangle$ in the last qubit. This can be done using an operator Q, based on $\mathcal{A}$ as well as $\mathcal{A}$, and Quantum Phase Estimation to approximate certain eigenvalues of Q.

More formally, for a given circuit $\mathcal{A}$ acting on n+1 qubits, the corresponding Q-operator used in amplitude estimation is defined as $$Q = \mathcal{A}(\mathbb{I} - 2|0\rangle_{n+1} \langle 0|_{n+1}) \mathcal{A}^\dagger (\mathbb{I} - 2|\psi_0\rangle_n|0\rangle \langle \psi_0|_n \langle 0|),$$

where $\mathbb{I}$ denotes the identity operator. If n=0, as described herein with respect to an example, the reflections defining Q reduce to the Pauli Z-matrix and Q simplifies to $\mathcal{A} Z \mathcal{A}^\dagger Z$. In addition, if $\mathcal{A} = R_y(\theta)$ then $Q = R_y(2\theta)$, where $R_y$ denotes a single qubit Y-rotation of the given angle.

This requires m additional qubits and $M = 2^m$ applications of $\mathcal{A}$ and $\mathcal{A}^\dagger$. The m qubits are first put into equal superposition by applying Hadamard gates. Then, they are used to control different powers of Q, and after an inverse Quantum Fourier Transform has been applied, their state is measured.

Figure 2:
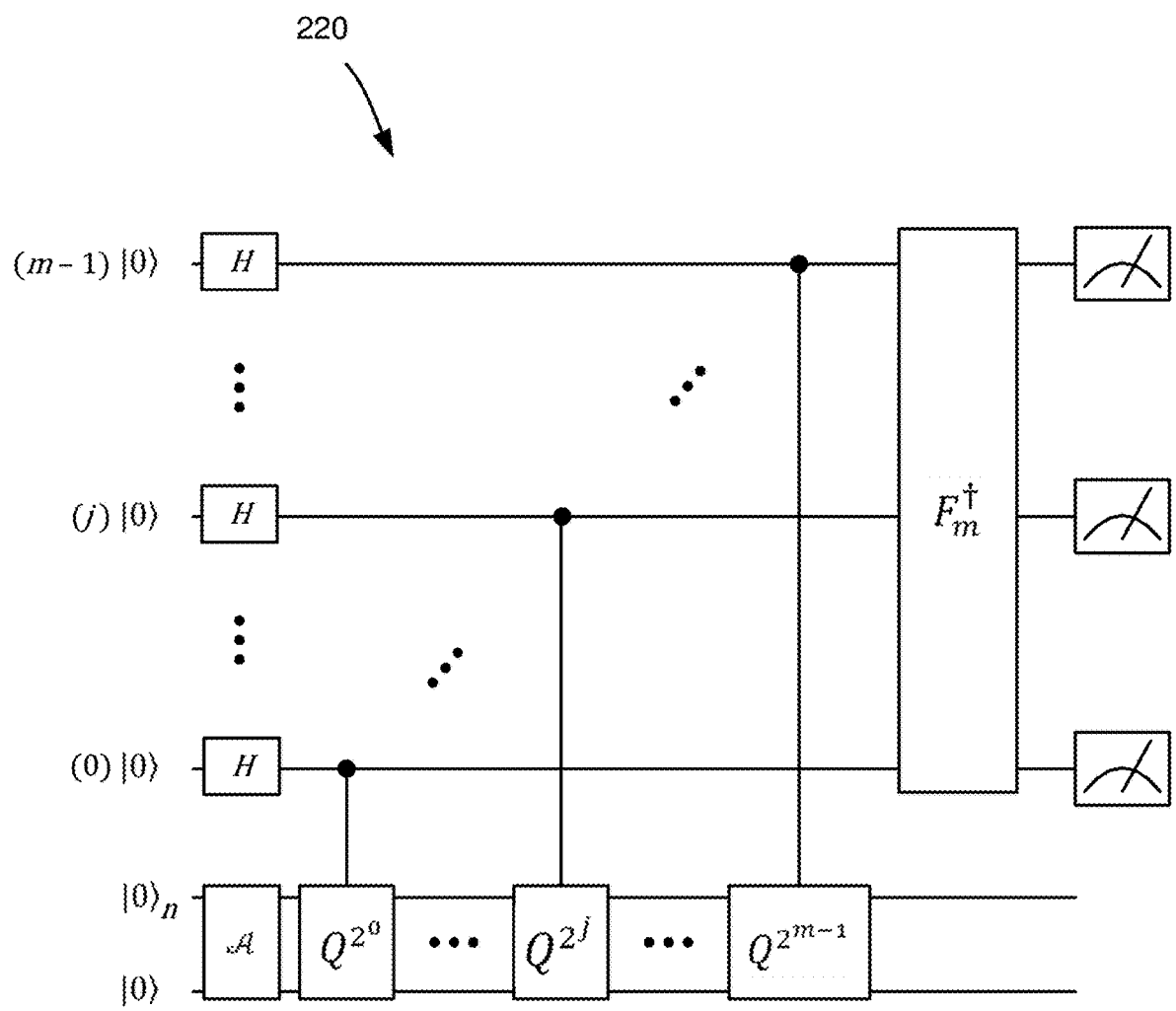
FIG. 2 is an example representation of a quantum circuit for quantum amplitude estimation, according to one or more example embodiments of the present disclosure.

FIG. 2 represents such a quantum circuit 220 for amplitude estimation, in which the boxes labeled H are Hadamard gates, and $F_m^\dagger$ denotes the inverse Quantum Fourier Transform on m qubits. The different powers of Q are in the boxes labeled as such. The "meters" following the inverse Quantum Fourier Transform correspond to the measurements.

This results in an integer $y \in \{0, \ldots, M-1\}$, which is classically mapped to the estimator $\tilde{a} = \sin^2(y\pi/M) \in [0,1]]$. The estimator $\tilde{a}$ satisfies $$|a - \tilde{a}| \leq \frac{2\sqrt{a(1-a)}\pi}{M} + \frac{\pi^2}{M^2} \qquad (1)$$

$$\leq \frac{\pi}{M} + \frac{\pi^2}{M^2} = O(M^{-1}), \qquad (2)$$

with probability at least $$\frac{8}{\pi^2}.$$

This represents a quadratic speedup compared to the $O(M^{-1/2})$ convergence rate of classical Monte Carlo methods.

With respect to using amplitude estimation to approximate the expected value of a random variable, consider a quantum state $$|\psi\rangle = \sum_{i=0}^{N-1} \sqrt{p_i}\, |i\rangle_n \qquad (3)$$

where the probability to measure the state $|i\rangle_n$ is $p_i \in [0,1]$, with $\Sigma_{i=0}^{N-1} p_i = 1$, and $N=2^n$. The state $|i\rangle_n$ is one of the V possible realizations of a bounded discrete random variable X, which, for instance, can represent a discretized interest rate or the value of a portfolio.

Consider a function $f: \{0, \ldots, N-1\} \to [0,1]$ and a corresponding operator $$F: |i\rangle_n |0\rangle \mapsto |i\rangle_n (\sqrt{1-f(i)}|0\rangle + \sqrt{f(i)}|1\rangle) \qquad (4)$$

for all $i \in \{0, \ldots, N-1\}$, acting on an ancilla qubit. Applying F to $|\psi\rangle_n |0\rangle$ leads to the state $$\sum_{i=0}^{N-1} \sqrt{1-f(i)}\, \sqrt{p_i}\, |i\rangle_n|0\rangle + \sum_{i=0}^{N-1} \sqrt{f(i)}\, \sqrt{p_i}\, |i\rangle_n|1\rangle$$

At this point, amplitude estimation can be used to approximate the probability of measuring $|1\rangle$ in the last qubit, which equals $\Sigma_{i=0}^{N-1} p_i f(i)$ and thus also $\mathbb{E}[f(X)]$, i.e., the expected value of $f(X)$. Choosing $f(i)=i/(N-1)$ allows estimating $$\mathbb{E}\left[\frac{X}{N-1}\right]$$

and hence $\mathbb{E}[X]$. By choosing $f(i)=i^2/(N-1)^2$, $\mathbb{E}[X^2]$ can be efficiently estimated, which yields the variance $\mathrm{Var}(X) = \mathbb{E}[X^2] - \mathbb{E}[X]^2$.

This above general technique can be extended to evaluate risk measures such as value at risk (VaR) and conditional value at risk (CVaR). For a given confidence level $\alpha \in [0,1]$, $\mathrm{VaR}_\alpha(X)$ can be defined as the smallest value $x \in \{0, \ldots, N-1\}$ such that $\mathbb{P}[X \leq x] \geq (1-\alpha)$. To find $\mathrm{VaR}_\alpha(X)$ on a quantum computer, define the function $f_l(i)=1$ if $i \leq l$ and $f_l(i)=0$ otherwise, where $l \in \{0, \ldots, N-1\}$. Applying $F_l$, (i.e. the operator corresponding to $f_l$) to $|\psi\rangle_n|0\rangle$ leads to the state $$\sum_{i=l+1}^{N-1} \sqrt{p_i}\, |i\rangle_n|0\rangle + \sum_{i=0}^{l} \sqrt{p_i}\, |i\rangle_n|1\rangle \qquad (5)$$

The probability of measuring $|1\rangle$ for the last qubit is $\Sigma_{i=0}^{l} p_i = \mathbb{P}[X \leq l]$. Therefore, a bisection search over l can and the smallest level $l_\alpha$ such that $\mathbb{P}[X \leq l_\alpha] \geq 1-\alpha$ (i.e., the probability of X being less than or equal to $l_\alpha$ should be larger than or equal to $1-\alpha$) in at most n steps. The smallest level $l_\alpha$ is equal to $\mathrm{VaR}_\alpha(X)$. This allows estimating $\mathrm{VaR}_\alpha(X)$ as before with accuracy $O(M)^{-1}$, which again is a quadratic speedup compared to classical Monte Carlo methods.

$\mathrm{CVaR}_\alpha(X)$ is the conditional expectation of X restricted to $\{0, \ldots, l_\alpha\}$, where $l_\alpha = \mathrm{VaR}_\alpha(X)$ is computed as before. To estimate CVaR, apply the operator F that corresponds to the function $$f(i) = \frac{1}{l_\alpha} \cdot f_{l_\alpha}(i)$$

to $|\psi\rangle_n |0\rangle$, which leads to the state $$\left(\sum_{i=l_\alpha+1}^{N-1} \sqrt{p_i}\, |i\rangle_n + \sum_{i=0}^{l_\alpha} \sqrt{1-\frac{i}{l_\alpha}}\, \sqrt{p_i}\, |i\rangle_n\right)|0\rangle + \sum_{i=0}^{l_\alpha} \sqrt{\frac{i}{l_\alpha}}\, \sqrt{p_i}\, |i\rangle_n|1\rangle \qquad (6)$$

The probability of measuring $|1\rangle$ for the last qubit equals $$\sum_{i=0}^{l_\alpha} \frac{i}{l_\alpha} p_i,$$

which can be approximated using amplitude estimation. However, it is known that $\Sigma_{i=0}^{l_\alpha} p_i$ does not sum up to one but to $\mathbb{P}[X \leq l_\alpha]$ as evaluated during the VaR estimation. Therefore the probability of measuring $|1\rangle$ is normalized to get $$CVaR_\alpha(X) = \frac{l_\alpha}{\mathbb{P}[X \leq l_\alpha]} \sum_{i=0}^{l_\alpha} \frac{i}{l_\alpha} p_i \qquad (7)$$

with $l_\alpha$ multiplied (because otherwise $$CVaR_\alpha\left(\frac{X}{l_\alpha}\right)$$

would be estimated). Even though $\mathbb{P}[X \leq l_\alpha]$ is replaced by an estimation, a quadratic speed up is still achieved compared to classical Monte Carlo methods.

In this way, the expected value, variance, VaR and CVaR of X can be calculated. However, if interested in properties of $g(X)$, for a given function $g: \{0, \ldots, N-1\} \to \{0, \ldots, N'-1\}$, $N'=2^{n'}-1$, $n' \in \mathbb{N}$, an operator $G: |i\rangle_n|0\rangle_{n'} \mapsto |i\rangle_n|g(i)\rangle_{n'}$ can be applied, using the above described algorithms on the second register. Alternatively, as long as the bisection search on $g(X) \leq l$ for $l \in \{0, \ldots, N'-1\}$ can be efficiently performed, the second register can be avoided by combining $f$ and $g$ and applying the algorithms directly.

Turning to quantum circuits, as described herein the above-described algorithms can be mapped to quantum circuits. The construction of $|\psi\rangle_n$, as set forth in equation (3), represents the probability distribution of a random variable X mapped to $\{0, \ldots, N-1\}$. In a worst case, creating $|\psi\rangle_n$ in requires $O(2^n)$ gates. However, approximations with polynomial complexity in n are possible for many distributions, e.g., log-concave distributions.

Assume a given operator $\mathcal{R}$ such that $\mathcal{R}|0\rangle_n = |\psi\rangle_n$. If interested in the properties of g(X), as described above, then, depending on g, basic arithmetic operations can be used to construct the operator G. Numerous quantum algorithms exist for arithmetic operations, as well as tools to translate classical logic into quantum circuit.

Approximating $\mathbb{E}[X]$ using amplitude estimation is based on combining the operator F for $f(x)=x/(N-1)$, defined in equation (4), with $\mathcal{R}$ to get the operator $\mathcal{A}$. In general, representing F for the expected value or for the CVaR is difficult and requires an exponential $O(2^n)$ number of gates or additional ancillas to pre-compute the (discretized) function $f$ into qubits before applying the rotation. The number of ancillas depends on the desired accuracy of the approximation of F.

In one aspect, this difficulty can be overcome by approximating F with polynomially many gates, at the cost of a lower (but still faster than classical) rate of convergence. Note that the operator required for estimating VaR is easier to construct, and the optimal rate of convergence cam be achieved as described herein.

Figure 3:
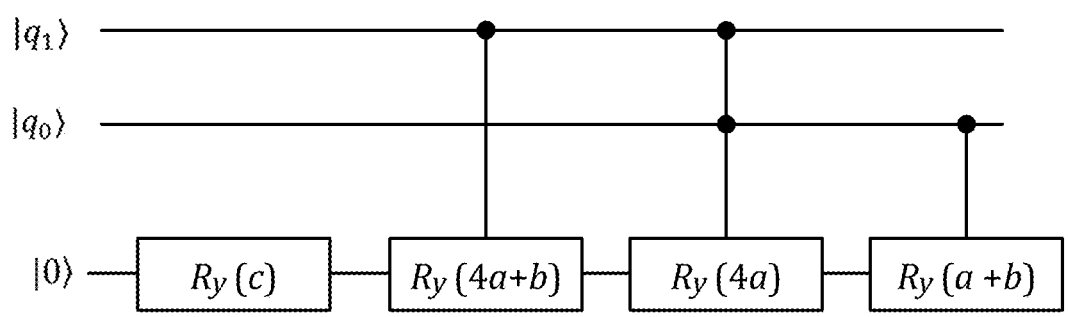
FIG. 3 is an example representation of a quantum circuit with Y-rotations based on a polynomial, according to one or more example embodiments of the present disclosure.

Note that as described herein, an operator $P:|x\rangle_n|0\rangle \mapsto |x\rangle_n(\cos(p(x))|0\rangle + \sin(p(x))|1\rangle)$ for a given polynomial $p(x) = \sum_{j=0}^{k} p_j x^j$ of order k, can be efficiently constructed using multi-controlled Y-rotations, as illustrated in FIG. 3 (in which $R_y$ denotes a Y-rotation). In FIG. 3, a quantum circuit is shown that realizes $|x\rangle_n|0\rangle \mapsto |x\rangle_n(\cos(p(x)/2)|0\rangle + \sin(p(x)/2)|1\rangle)$ for $p(x)=(ax^2+bx+c)$ and $x \in (0, 1, 2, 3)$. Exploiting $x=(2q_1+q_0)$ and $q_i^2=q_i$ (because $q_i$—the value of the qubit i—is either 0 or 1, squaring it does not change anything) leads to $p(x)=(4a+b)q_1+4aq_0q_1+(a+b)q_0+c$ (results from replacing x by the given formula and exploiting that squaring binaries does not change the value), which can be directly mapped to a circuit.

Single qubit operations with n-1 control qubits can be exactly constructed, e.g., using O(n) gates and O(n) ancillas or $O(n^2)$ gates without any ancillas. They can also be approximated with accuracy $\varepsilon > 0$ using $O(n \log(1/\varepsilon))$ gates. For simplicity, described herein is using O(n) gates and O(n) ancillas. Because binary variable representation of p, illustrated in FIG. 3, leads to at most $n^k$ terms, where n is the number considered qubits and k is the degree of the polynomial p, the operator P can be constructed using $O(n^{k+1})$ gates and O(n) ancillas.

For every analytic function $f$, there exists a sequence of polynomials such that the approximation error converges exponentially fast to zero with increasing order of the polynomials. Thus, for simplicity, it can be assumed that $f$ is a polynomial of order s.

By finding a polynomial p(x) such that $\sin^2(p(x))=f(x)$, the above description provides a way to construct the operator F. Because the expected value is linear, one implementation can choose to estimate $$\mathbb{E}\left[c\left(f\left(X-\frac{1}{2}\right)\right)+\frac{1}{2}\right]$$

instead of $\mathbb{E}[f(X)]$ for a scaling parameter $c \in (0,1]$, chosen by the user, and then map the result back to an estimator for $\mathbb{E}[f(X)]$. The rationale behind this choice is that $$\sin^2\left(y+\frac{\pi}{4}\right) = y + \frac{1}{2} + O(y^3).$$

For ease of presentation, assume $f(x)=x$. Thus, the process seeks to find p(x) such that $$c\left(x-\frac{1}{2}\right)+\frac{1}{2}$$

is sufficiently well approximated by $$\sin^2\left(cp(x)+\frac{\pi}{4}\right).$$

Setting the two terms equal and solving for p(x) leads to $$p(x) = \frac{1}{c}\left(\sin^{-1}\left(\sqrt{c\left(x-\frac{1}{2}\right)+\frac{1}{2}}\right)-\frac{\pi}{4}\right) \quad (8)$$

choosing p(x) as a Taylor approximation of equation (8) around $x=\frac{1}{2}$. Note that equation (8) defines an odd function around $x=\frac{1}{2}$, and thus the even terms in the Taylor series equal zero. The Taylor approximation of order $(2r+1)$, $r \geq 0$, where the integer r can be chosen by the user, leads to an error bounded by $$\frac{c^{2r+3}}{(2r+3)2^{r+1}} + O(c^{2r+5}). \quad (9)$$

Assuming again that $f$ is a polynomial of order s and plugging it into p(x), the resulting polynomial has order $s(2r+1)$ and the number of gates to construct the corresponding circuit scales as $O(n^{s(2r+1)+1})$. The smallest scenario of interest is s=1 and r=0, i.e., both $f$ and p are linear functions, which leads to a circuit for F where the number of gates scales quadratically in the number of qubits.

Thus, using amplitude estimation to estimate $$\mathbb{E}\left[c\left(f(x)-\frac{1}{2}\right)+\frac{1}{2}\right]$$

leads to a maximal error $$\frac{\pi}{M} + \frac{c^{2r+3}}{(2r+3)2^{r+1}} + O(c^{2r+5} + M^{-2}) \quad (10)$$

where the higher order terms in the following are ignored. Because the estimation uses cf(x), the scaled error $c\varepsilon$ is analyzed, where $\varepsilon > 0$ denotes the resulting estimation error for $\mathbb{E}[f(x)]$. Setting equation (10) equal to $c\varepsilon$ and reformulating it leads to $$c\varepsilon - \frac{c^{2r+3}}{(2r+3)2^{r+1}} = \frac{\pi}{M}. \quad (11)$$

Maximizing the left-hand-side with respect to c, i.e. minimizing the number of required samples M to achieve a target error $\varepsilon$, results in $$c^* = \sqrt{2}\,\varepsilon^{\frac{1}{2r+2}}.$$

Plugging c* into equation (11) gives $$\sqrt{2}\left(1 - \frac{1}{2r+3}\right)\epsilon^{1+\frac{1}{2r+2}} = \frac{\pi}{M}. \qquad (12)$$

Translating this into a rate of convergence for the estimation error ε with respect to the number of samples M leads to $$\varepsilon = O\!\left(M^{-\frac{2r+2}{2r+2}}\right).$$

For r=0, $$O\!\left(M^{-\frac{2}{3}}\right),$$

which is already better than the classical convergence rate. For increasing r, the convergence rate quickly approaches the optimal rate of $O(M^{-1})$.

For the estimation of the expectation, note that $$\sin^2\!\left(y + \frac{\pi}{4}\right) \approx y + \frac{1}{2}.$$

For the variance, the same idea is applied, but using $\sin^2(y) \approx y^2$. This approximation is applied to estimate the value of $\mathbb{E}[f(X)^2]$, and then, together with the estimation for $\mathbb{E}[f(X)]$, evaluate Var $(f(X))=\mathbb{E}[f(X)^2]-\mathbb{E}[f(X)]^2$. The resulting convergence rate is again $$O\!\left(M^{-\frac{2r+2}{2r+3}}\right).$$

Thus, quantum circuits can be built to estimate E [f(X)] and Var(f(X)) more efficiently than is possible classically. Further described herein is extending this to VaR and CVaR.

Consider the state to $|\psi\rangle_n$ corresponding to the random variable X on $\{0, \ldots, N-1\}$ and a fixed $l \in \{0, \ldots, N-1\}$. To estimate VaR, an operator $F_l$ is needed that maps $|x\rangle_n|0\rangle$ to $|x\rangle_n|1\rangle$ if $x \leq l$ and to $|x\rangle_n|0\rangle$ otherwise, for all $x \in \{0, \ldots, N-1\}$. Then, for the fixed l, amplitude estimation can be used to approximate $\mathbb{P}[X \leq l]$, as shown in equation (6). With (n+1) ancillas, adder circuits can be used to construct $F_l$ using O(n) gates, and the resulting convergence rate is $O(M^{-1})$. For a given level α, a bisection search can find the smallest l level such that $\mathbb{P}[X \leq l_\alpha]$, in at most n steps, providing $l_\alpha = \text{VaR}_\alpha(X)$.

To estimate the CVaR, the circuit $F_l$ for l is applied to an ancilla qubit, with this ancilla qubit used as a control for the operator F used to estimate the expected value, but with a different normalization, as shown in equation (6). Based on the above description, it follows that amplitude estimation can then be used to approximate $\text{CVaR}_\alpha(X)$ with the same tradeoff between circuit depth and convergence rate as for the expected value.

By way of an example, consider measuring the financial risk in a T-bill faced by a possible interest rate increase. As is understood, the model described herein provides an improved convergence rate over Monte Carlo methods.

Thus, the model is based on a zero coupon bond discounted at an interest rate r. A step is to find the value of the bond today, given that in the next time step, there might be a δr rise in r. The value of the bond with face value $V_F$ is $$V = \frac{(1-p)V_F}{1+r+\delta r} + \frac{pV_F}{1+r} = (1-p)V_{low} + pV_{high}. \qquad (13)$$

where p and (1−p) denote the probabilities of a constant interest rate and a rise, respectively. Note that this model can be the first step of a binomial tree, where binomial trees can be used to price securities with a path dependency such as bonds with embedded options.

The straightforward scenario in equation (13) can correspond to a market participant who bought a one year T-bill the day before a Federal Open Markets Committee announcement and expects a δr=0: 25%-points increase of the Federal Funds Rate with a (1−p)=70% probability and no change in points with a p=30% probability. Described herein is how to calculate the value of the investor's T-bill on the a quantum computer by using amplitude estimation and mapping V to [0, 1] such that $V_{low}$ and $V_{high}$, i.e., the value of the portfolio in case of an interest rate increase and no increase, respectively, correspond to $0 and $1, respectively.

In this example, only a single qubit is needed to represent the uncertainty and the objective, with $\mathcal{A}=R_y(\theta_p)$, where $\theta_p=2\sin^{-1}\sqrt{p}$, and thus, $\mathcal{A}|0\rangle=\sqrt{1-p}|0\rangle+\sqrt{p}|1\rangle$. For the one-dimensional case, it is seen that the amplitude estimation operator $Q=\mathcal{A}Z\mathcal{A}^\dagger Z=R_y(2^{j+1}\theta_p)$, where Z denotes the $\sigma_z$ Pauli operator. In particular, this implies $Q^{2^j}=R_y(2^{j+1}\theta_p)$, which allows us to construct the amplitude estimation circuit efficiently to approximate the parameter $p=\mathbb{E}[X]=30\%$. Although a single period binomial tree is a very simple model, it is straightforward to extend such a model to multi-period multi-nominal trees with path-dependent assets. Thus, the model represents the smallest building block for interesting scenarios of arbitrary complexity.

Figure 4:
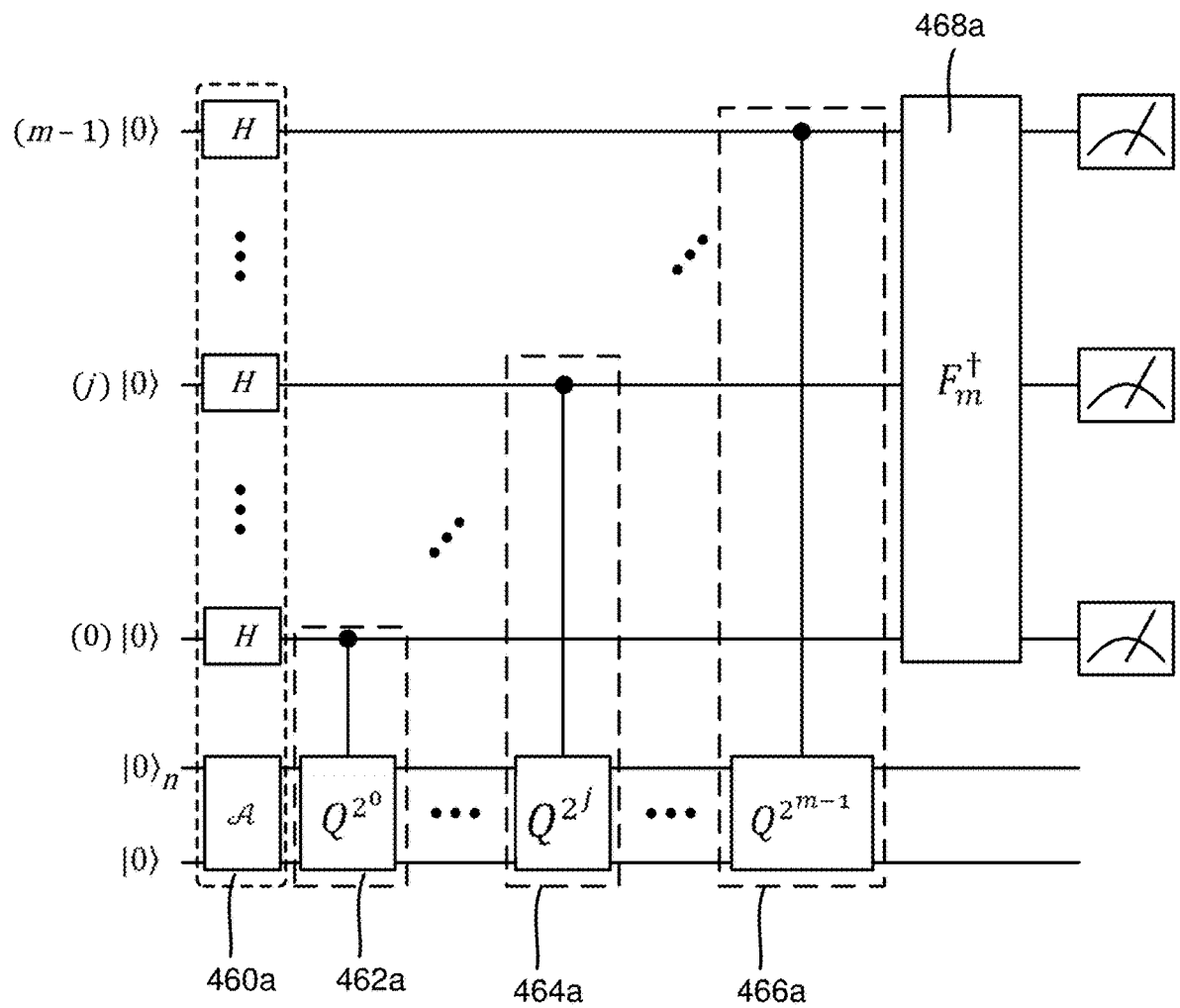
FIG. 4 is an example representation of a quantum circuit for quantum amplitude estimation, according to one or more example embodiments of the present disclosure.
Figure 5:
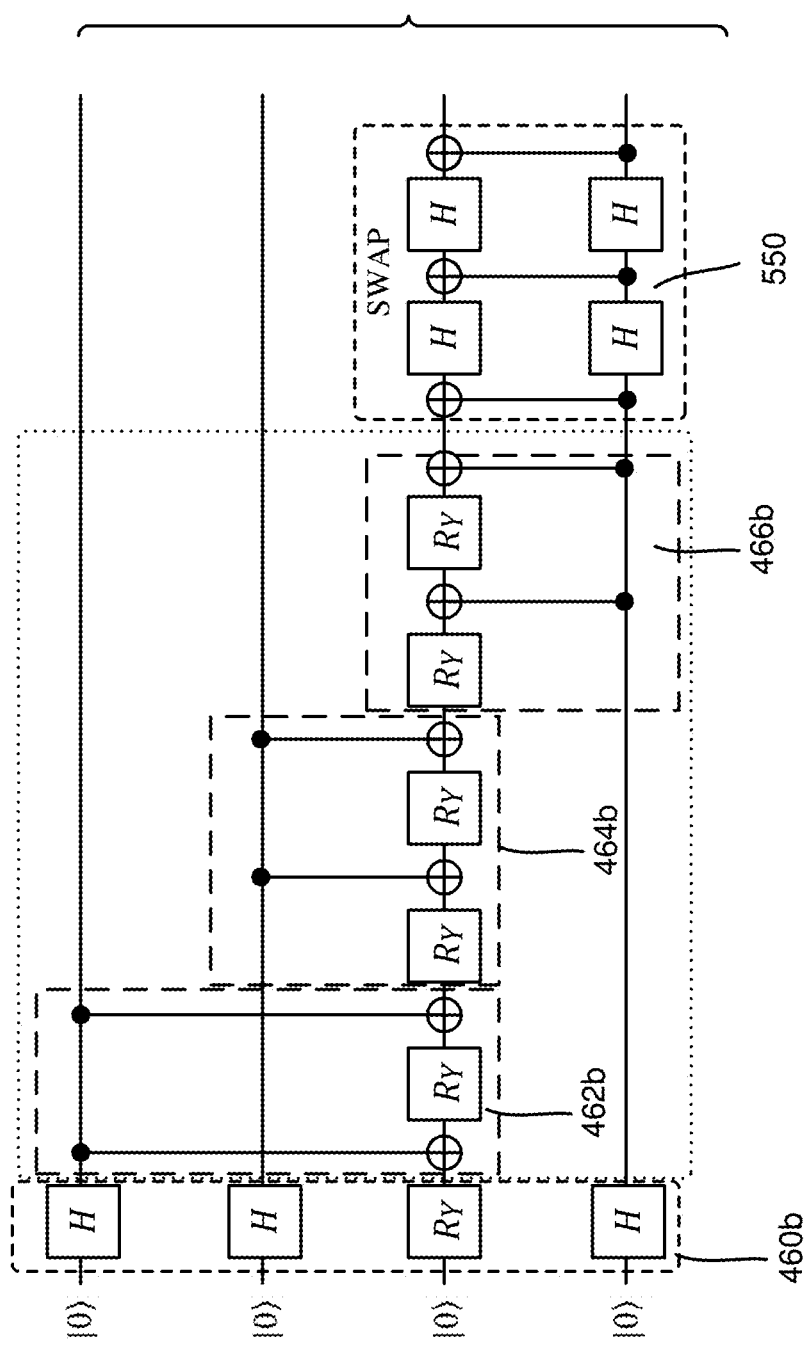
FIGS. 5 and 6 comprise a representation of a quantum circuit for amplitude estimation circuit for an example risk analysis problem, according to one or more example embodiments of the present disclosure.
Figure 6:
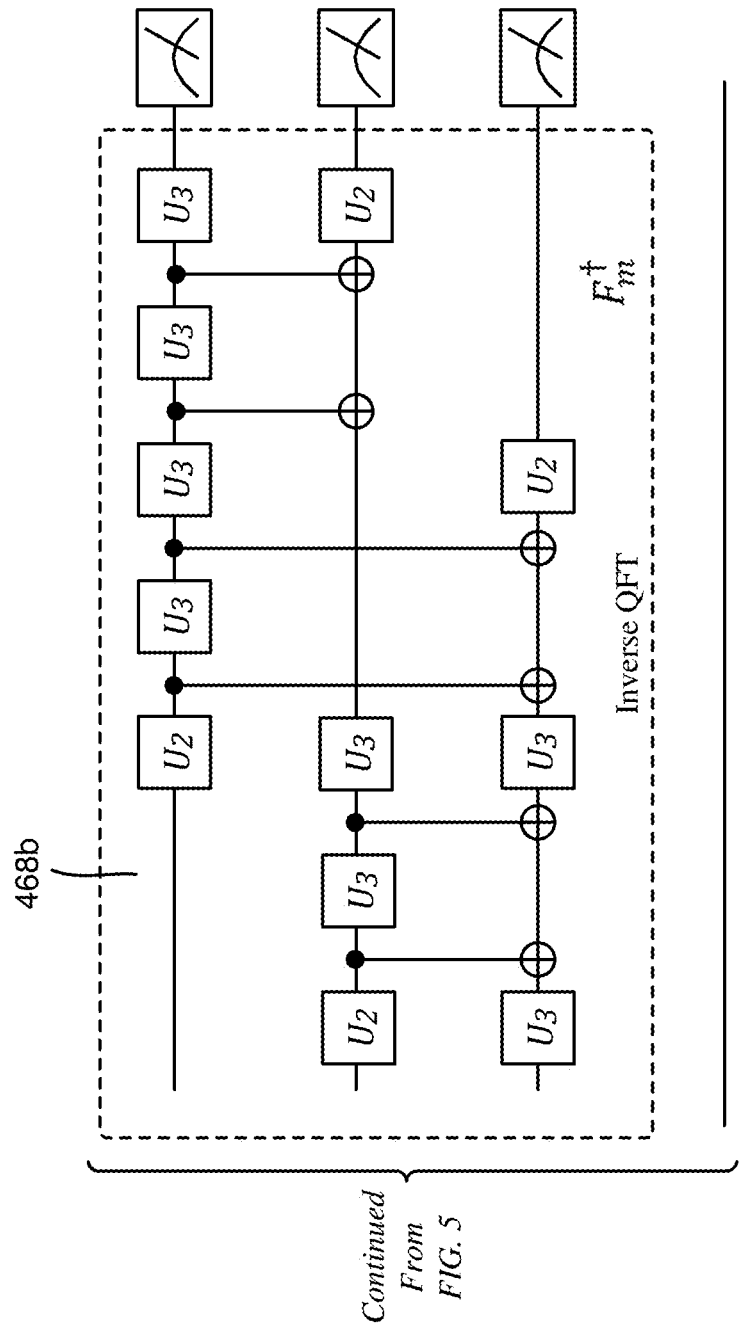
Figure 7A:
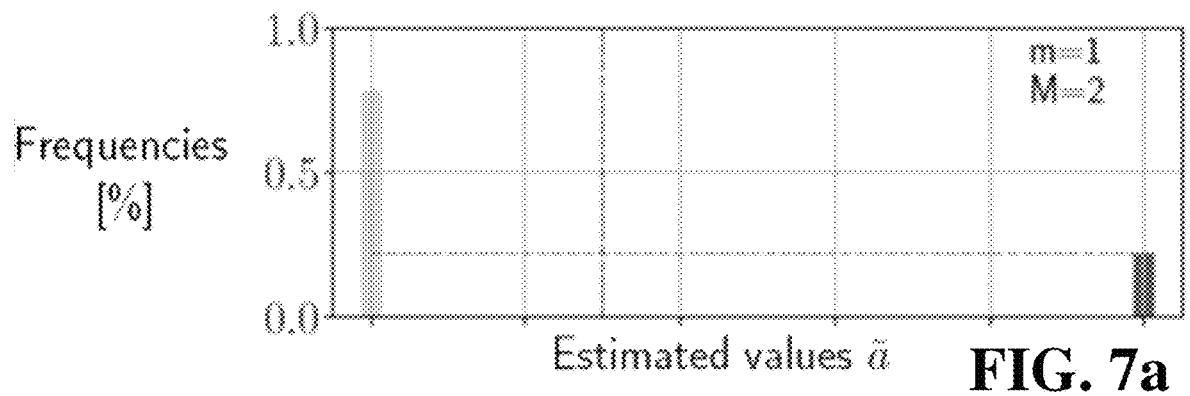
FIGS. 7a-7d are example representations of results of amplitude estimation for various evaluation qubits, according to one or more example embodiments of the present disclosure.
Figure 7B:
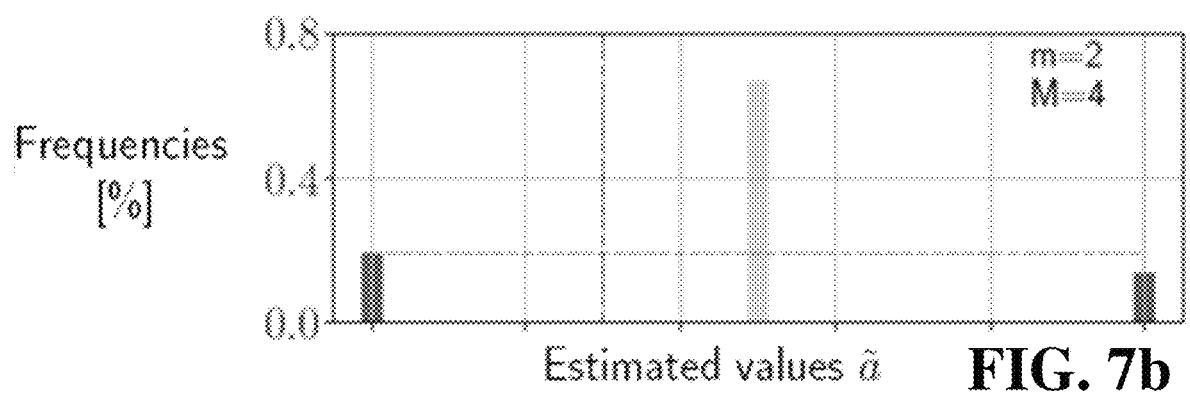
Figure 7C:
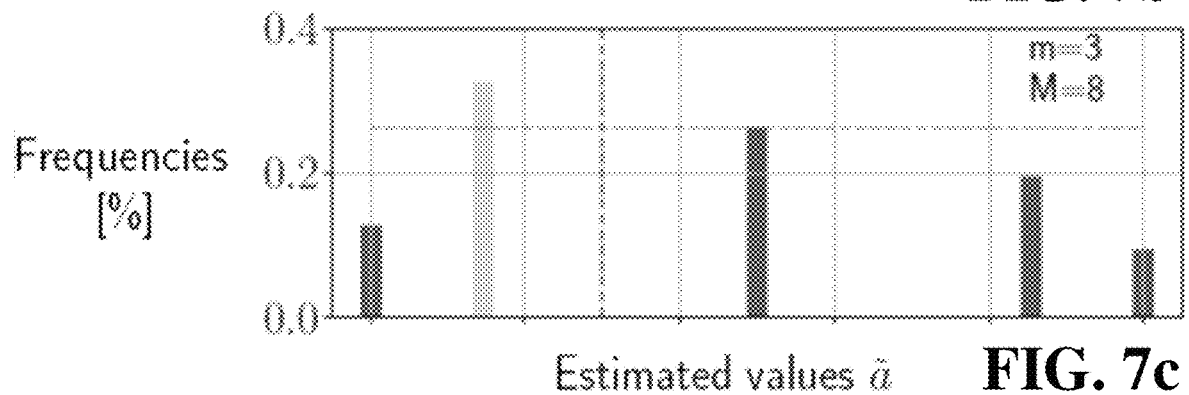
Figure 7D:
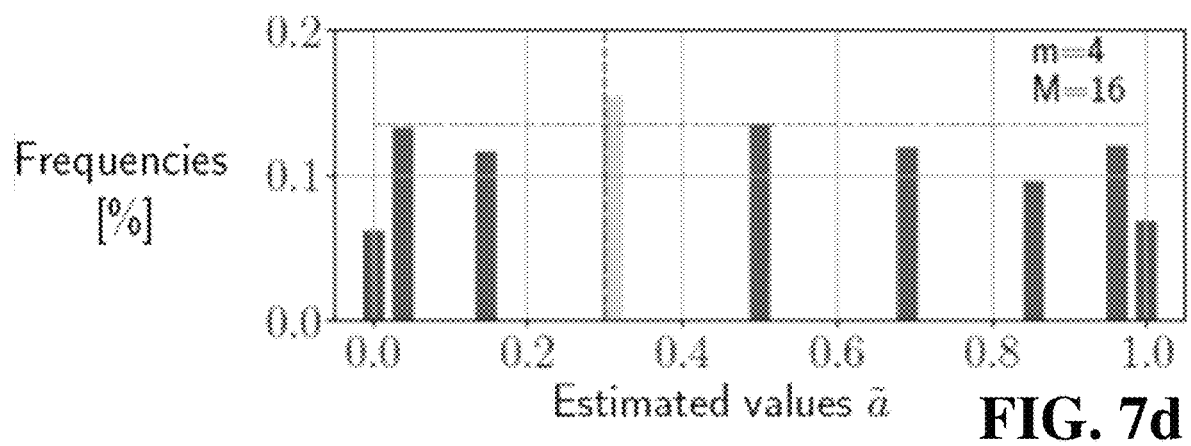

FIG. 4 (a visually enhanced version of FIG. 2), along with FIGS. 5 and 6, illustrate an amplitude estimation circuit for the T-Bill example with m=3. In FIG. 4, the dashed box 460a around the Hadamard (H) gates correspond to the dashed box 460b in FIG. 5, and the dashed boxes 462a, 464a and 466a in FIG. 4 correspond to the dashed boxes 462b, 464b and 466b in FIG. 5. The transform box 468a in FIG. 4 corresponds to the box 468b in FIG. 6.

The swap (block 550, FIG. 5) is used to overcome the limited connectivity of the chip, in one or more implementations. The blocks in FIG. 6 for U2 and U3 indicate single qubit rotations. Note that the circuit could be further optimized, e.g., the adjoint controlled not (CNOT) gates at the beginning of the swap in block 550 can cancel, but are shown herein for purposes of illustration.

Experiments were run which applied amplitude estimation with a different number of evaluation qubits m=1, 2, 3, 4 corresponding to M=2, 4, 8, 16 samples, respectively, to estimate p=[X]. This uses at most five qubits and can be implemented and run on an IBM Q 5 quantum processor with five qubits (accessible via the IBM Q Experience). As discussed herein, the success probability of amplitude estimation is larger than $$\frac{8}{\pi^2},$$

but not necessary 100 percent, and the real hardware introduces additional errors. Thus, every circuit is repeated 8192 times (i.e., the maximal number of shots in the IBM Q Experience) to get a reliable estimate. This implies a constant overhead, which can be ignored in the comparison of the algorithms. The quantum circuit for m=3 compiled to the IBM Q 5 quantum processor is illustrated in FIGS. 5 and 6. The connectivity of the IBM Q 5 quantum processor, necessitates swapping two qubits in the middle of the circuit between the application of the controlled Q operators and the inverse Quantum Fourier Transform.

The results of the quantum algorithm are illustrated in FIGS. 7*a*-7*d*, where it can be seen that the most frequent estimator approaches the real value p and how the resolution of the algorithm increases with m. More particularly, FIGS. 7*a*-7*d* show results of amplitude estimation for m=1, . . . , 4 with 8192 shots each. The light bars indicate the probability of the most frequent estimate and the darker bars the probability of the other estimates. The vertical dashed lines indicate the target value of 30%. The gray horizontal dashed lines show the probability of the second most frequent value to highlight the resulting contrast. The possible values are not equally distributed on the x-axis, because amplitude estimation first returns a number y∈{0, . . . , M−1} that is then classically mapped to $$= \sin^2\left(\frac{y\pi}{M}\right).$$

Figure 8:
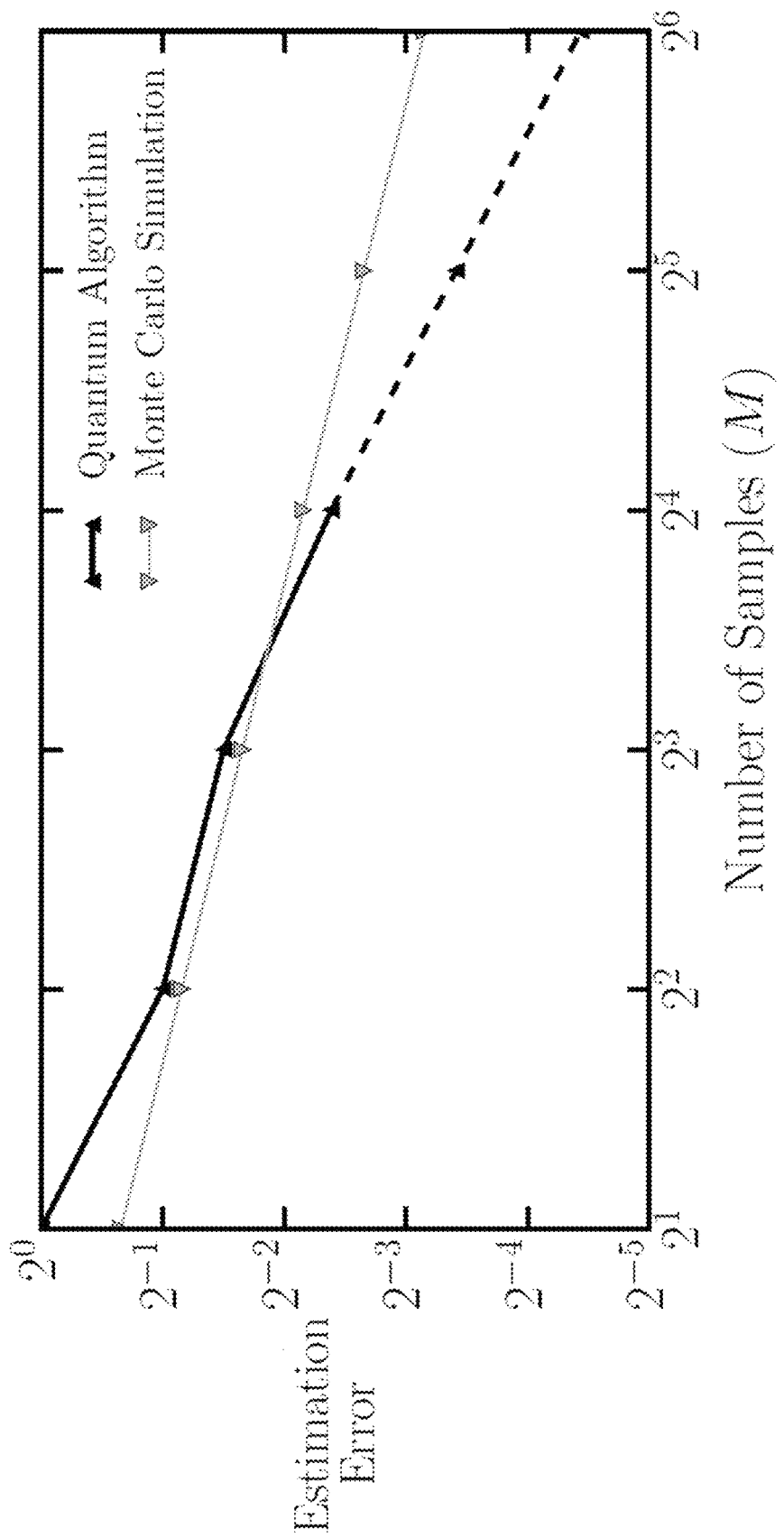
FIG. 8 is an example representation of a comparison of convergence of the error of Monte Carlo simulation versus the quantum algorithm described herein with respect to a number of samples M, according to one or more example embodiments of the present disclosure.

The quantum algorithm described herein outperforms the Monte Carlo method already for M=16 samples (i.e. m=4 evaluation qubits). FIG. 8 shows a comparison of convergence of the error of Monte Carlo simulation and the quantum algorithm with respect to the number of samples M. Although the quantum algorithm starts with a larger estimation error, for M≥16 (m≥4), the better convergence rate of the quantum algorithm takes over and the error stays below the Monte Carlo results. The darker solid line shows the error for real experiments using up to five qubits; the dashed line shows how the estimation error further decreases for experiments with six and seven qubits, respectively.

Turning to another example, consider using the quantum algorithm circuits to calculate the daily risk in a portfolio made up of one-year US Treasury bills and two-year US Treasury notes with face values $V_{F_1}$ and $V_{F_2}$, respectively, which can focus on the amplitude estimation algorithm applied to VaR. The portfolio is worth $$V(r_1, r_2) = \frac{V_{F_1}}{1+r_1} + \sum_{i=1}^{4} \frac{cV_{F_2}}{(1+r_2/2)^i} + \frac{V_{F_2}}{(1+r_2/2)^4} \quad (14)$$

where c is the coupon rate paid every six month by the two-year treasury note and $r_1$ and $r_2$ are the yield to maturity of the one-year bill and two-year note, respectively. US Treasuries are usually assumed to be default free. The cash-flows are thus known ex ante and the changes in the interest rates are the primary risk factors. Therefore, a proper understanding of the yield curve suffices to model the risk in this portfolio. In this work we use the Constant Maturity Treasury (CMT) rates to model the uncertainty in $r_1$ and $r_2$.

A principal component analysis reveals that the first three principal components, named shift, twist and butterfly, respectively account for 96% of the variance. Therefore, when modeling a portfolio of US Treasury securities it suffices to study the distribution of these three factors. This dimensionality reduction also lowers the amount of resources needed by the quantum algorithm.

Figure 9A:
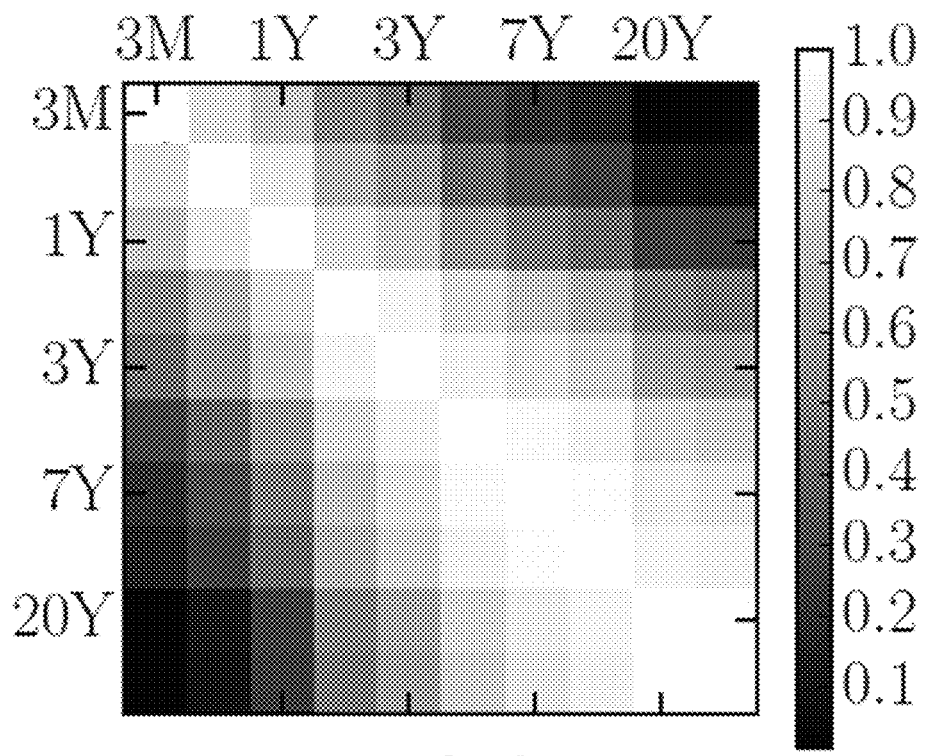
FIGS. 9a and 9b are example representations related to estimating risk based on example maturity treasury rates comprising a correlation matrix (FIG. 11a) and Shift, Twist and Butterfly components expressed in terms of the original constant maturity treasury rates, according to one or more example embodiments of the present disclosure.
Figure 9B:
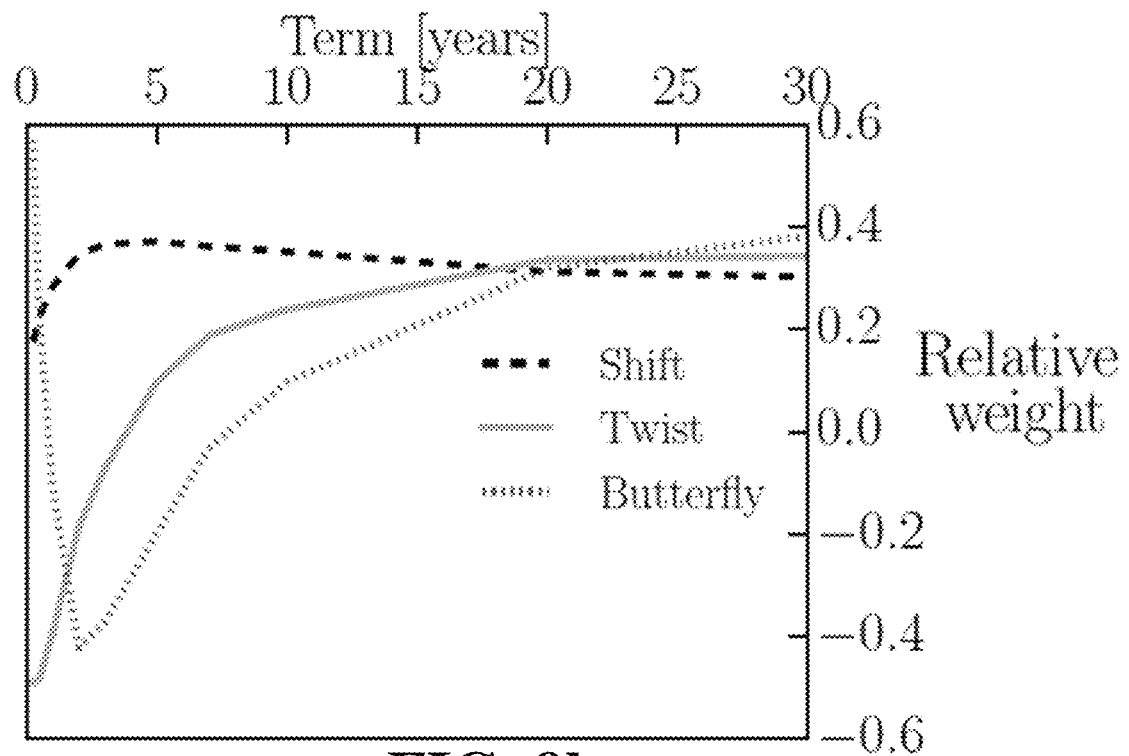
Figure 10A:
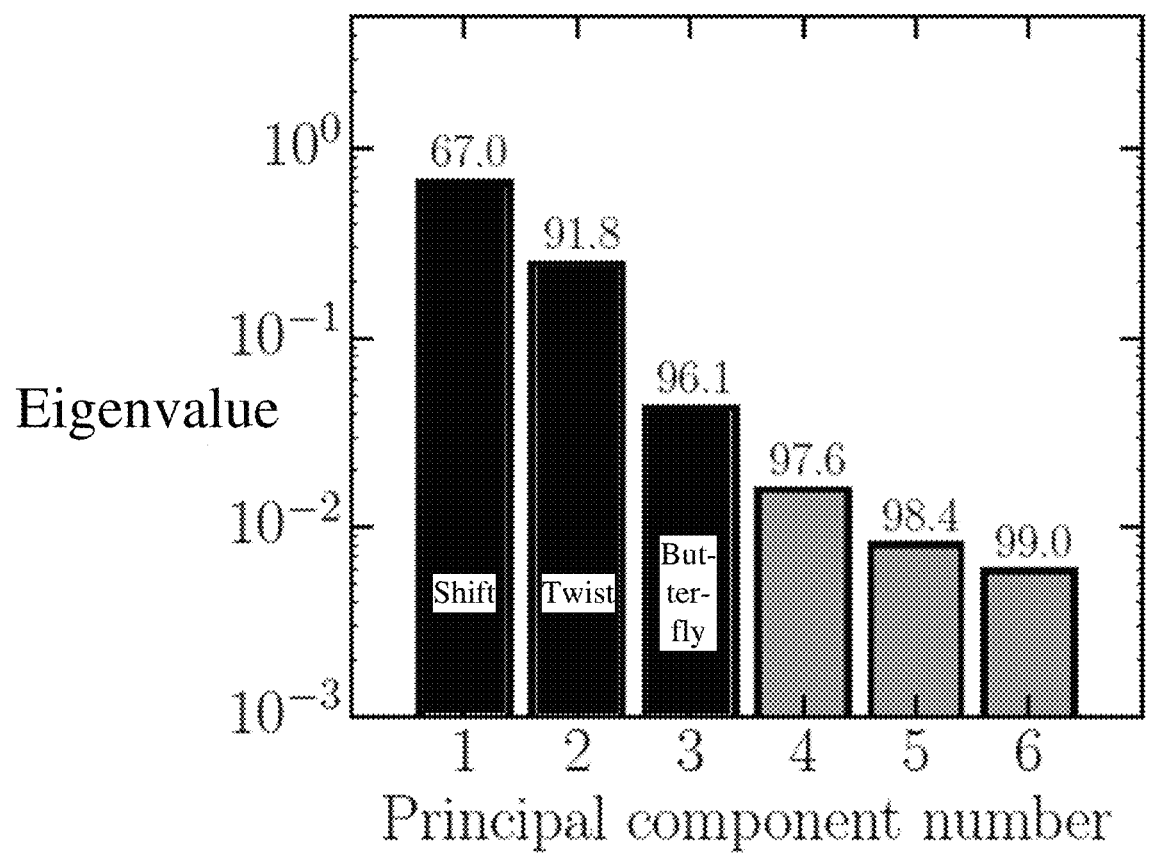
FIGS. 10a and 10b are example representations related to estimating risk for the examples of FIGS. 9a and 9b, illustrating Eigenvalues of the principal components (FIG. 10a), and marginal distribution of the Shift versus the Twist principal components (FIG. 10b), according to one or more example embodiments of the present disclosure.
Figure 10B:
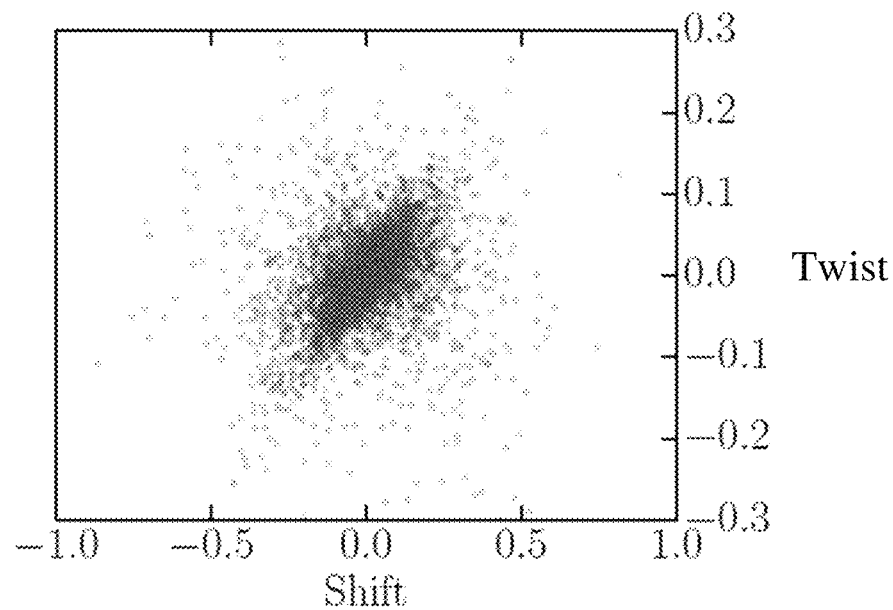

FIG. 9*a* shows daily change in the CMT rates comprising a correlation matrix. The high correlation between the rates can be exploited to reduce the dimension of the problem. FIG. 9*b* shows Shift, Twist and Butterfly components expressed in terms of the original constant maturity treasury rates. FIG. 10*a* shows Eigenvalues of the principal components; the numbers show the cumulative explained variance. FIG. 10*b* shows a marginal distribution of the Shift versus the Twist principal components.

To study the daily risk in the portfolio, write $r_i = r_{i,0} + \delta r_i$ where $r_{i,0}$ is the yield to maturity observed today and the random variable $\delta r_i$ follows the historical distribution of the one day changes in the CMT rate with maturity i. For this example, set $V_{F_1} = V_{F_2} = \$100$, r1,0=1.8%, r2,0=2.25%, and c=2.5% in equation (14). A principal component analysis of $\delta r_1$ and $\delta r_2$ is performed, and the shift S and twist T components retained. This is done to illustrate the use of principal component analysis even though in this example, there is no dimensionality reduction.

Figure 11:
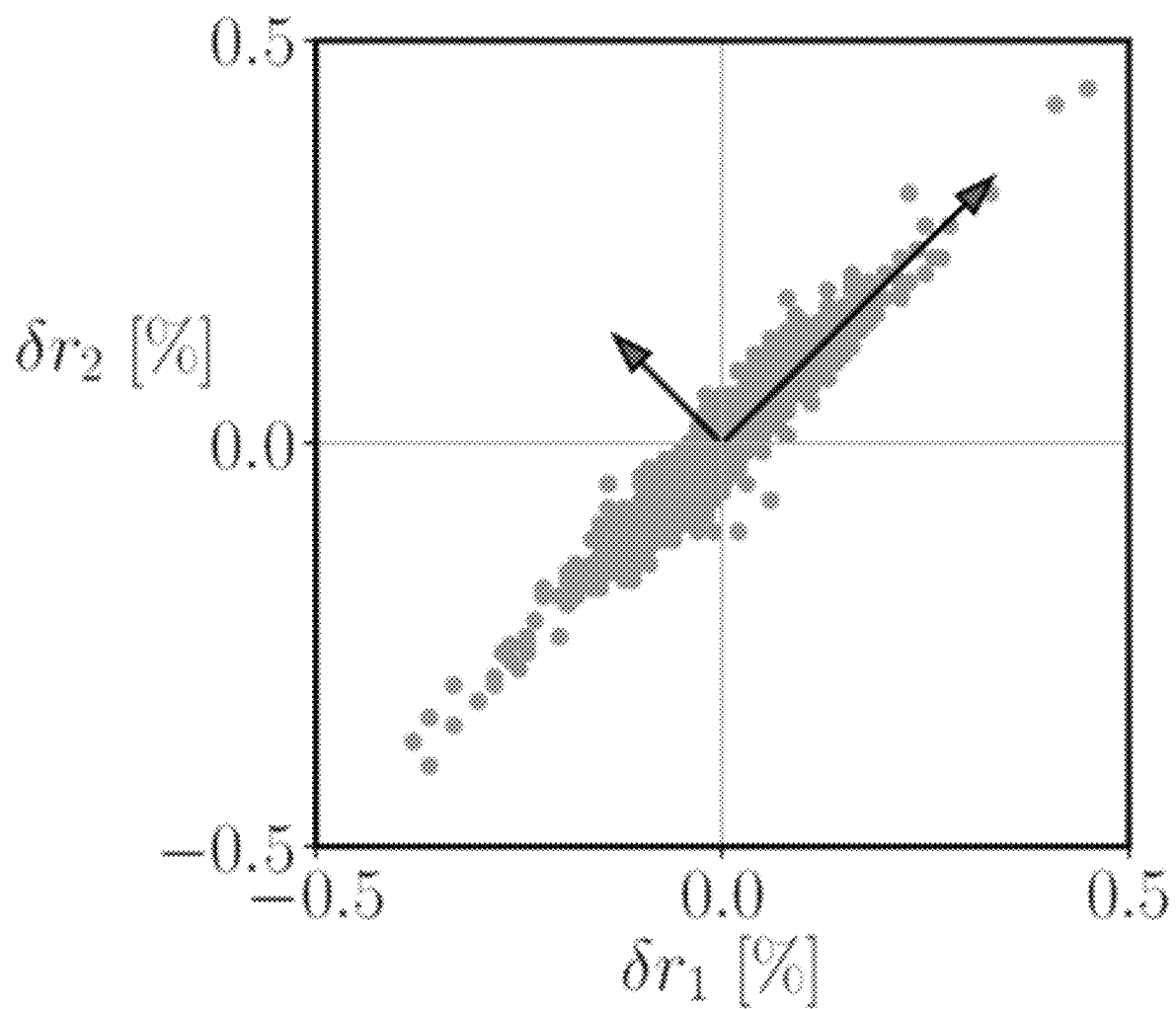
FIG. 11 is an example representation of historical constant maturity treasury rates (1-year against 2-years to maturity) as well as the resulting principal components of shift and twist according to one or more example embodiments of the present disclosure.

FIG. 11 illustrates the historical data (historical constant maturity treasury rates, 1-year against 2-years to maturity) as well as the resulting principal components: shift (longer vector), and twist (shorter vector). S and T are related to $\delta r_i$ by:

$$\begin{pmatrix} \delta r_1 \\ \delta r_2 \end{pmatrix} = W \begin{pmatrix} S \\ T \end{pmatrix} = \begin{pmatrix} 0.703 & -0.711 \\ 0.711 & 0.703 \end{pmatrix} \begin{pmatrix} S \\ T \end{pmatrix}. \quad (15)$$

Figure 12A:
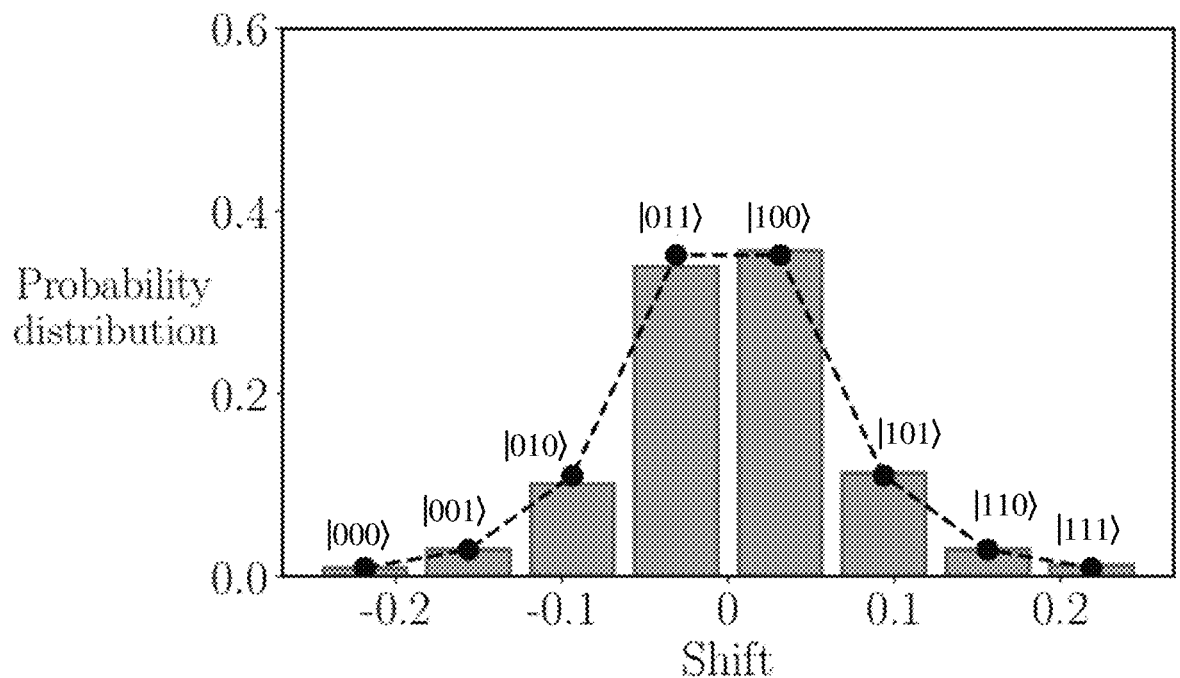
FIGS. 12a and 12b are example representations of histograms of historical shift data, as used in the treasury rates example(s), according to one or more example embodiments of the present disclosure.
Figure 12B:
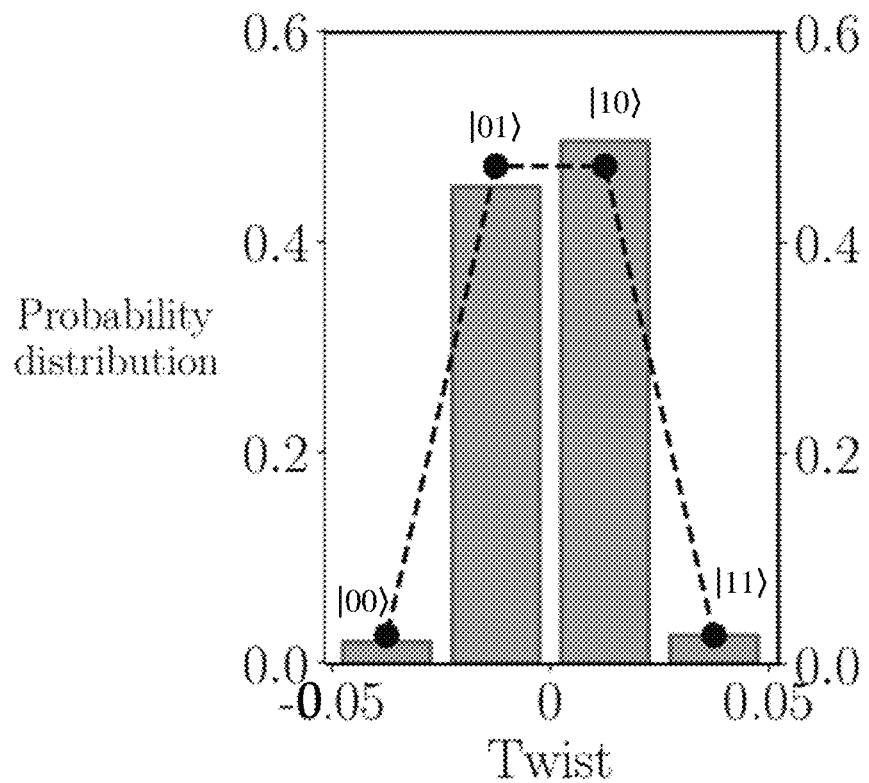

The correlation coefficient between shift and twist is −1%. They are thus assumed to be independent and fit discrete distributions to each separately, as represented in FIGS. 12*a* and 12*b*.

Turning to uncertainty representation in the quantum computer, three qubits can be used, denoted by $q_0$, $q_1$, $q_2$, to represent the distribution of S, and two, denoted by $q_3$, $q_4$, for T.

As described herein, the probability distributions are encoded by the states $|\varphi\rangle_S = \Sigma_{i=0}^{7} \sqrt{p_{i,S}}|i\rangle_8$ and $|\varphi\rangle_T = \Sigma_{i=0}^{3} \sqrt{p_{i,T}}|i\rangle_4$ for S and T, which can thus take eight and four different values, respectively. More qubits are used for S than for T because the shift explains a larger part of the variance. Additional qubits may be used to represent the probability distributions at a higher resolution. The qubits naturally represent integers via binary encoding and the affine mappings are applied:

$$S = 0.0626x - 0288, \quad (16)$$

$$T = 0.0250 y - 0.037 \quad (17)$$

Figure 13A:
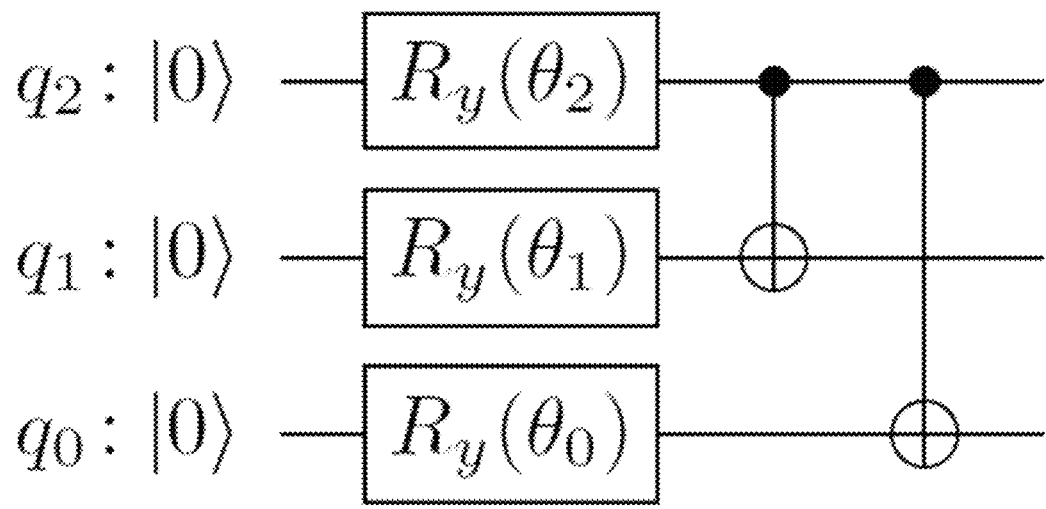
FIGS. 13a and 13b are example representations showing the quantum circuits used to load the distributions of FIGS. 12a and 12b, respectively, according to one or more example embodiments of the present disclosure.
Figure 13B:
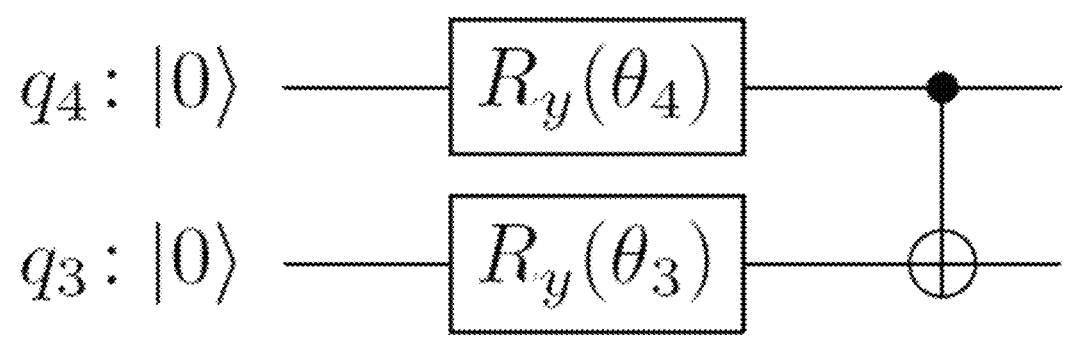

Here x∈{0, . . . , 7} and y∈{0, . . . , 3} denote the integer representations of S and T, respectively. Given the almost perfect symmetry of the historical data, symmetric distributions are fit to it. The operator $\mathcal{R}$ prepares a quantum state $\mathcal{R}|0\rangle_5$, illustrated by the dots in FIGS. 12*a* and 12*b*, that represents the distributions of S and T, up to the aforementioned affine mapping. That is, FIG. 12a shows an 8-bin histogram of historical shift data (bars) as well as fitted distribution (dashed line); FIG. 12b shows a 4-bin histogram of historical twist data (bars) as well as fitted distribution (dashed line). In both cases the labels show the quantum state that will occur with the corresponding probability. FIGS. 13a and 13b show the quantum circuits used to load the distributions of FIGS. 12a and 12b, respectively, into the quantum computer.

Another aspect shows how to construct the operator F to translate the random variables x and y into a portfolio value. Equations (14) through (17) allow defining the portfolio value V in terms of x and y, instead of $r_1$ and $r_2$. For simplicity, a first order approximation can be used, $$\tilde{f}(x,y) = 203.5170 - 13.1896x - 1.8175y \quad (18)$$

of V around the mid points x=3:5 and y=1:5. From a financial perspective, the first order approximation $\tilde{f}$ of V corresponds to studying the portfolio from the point of view of its duration. Higher order expansions, e.g. convexity, could be considered at the cost of increased circuit depth.

To map the approximated value of the portfolio $\tilde{f}$ to a function $f$ with target set [0, 1] compute $f=(\tilde{f}-\tilde{f}_{min})/(\tilde{f}_{max}-\tilde{f}_{min})$, where $\tilde{f}_{min}=\tilde{f}(7,3)$ and $\tilde{f}_{max}=\tilde{f}(0,0)$, i.e., the minimum and maximum values $\tilde{f}$ can take for the considered values of x and y. This leads to $$f(x,y) = 1 - 0.1349x - 0.0186y. \quad (19)$$

The approach, illustrated in FIG. 3, allows constructing an operator F corresponding to $f$ for a given scaling parameter $c \in [0,1]$.

Turning to results from simulations of an ideal quantum computer, the two asset portfolio is simulated for different numbers m of sampling qubits to show the behavior of the accuracy and convergence rate. This task is repeated twice, once for a processor with all-to-all connectivity and once for a processor with a connectivity corresponding to the IBM Q 20 chip. This highlights the overhead imposed by a realistic chip connectivity.

For a number $M=2^m$ samples, a total of m+12 qubits are needed for expected value and value at risk, and m+13 qubits for conditional value at risk. Five of these qubits are used to represent the distribution of the interest rate changes, one qubit is needed to create the state in equation (4) used by amplitude estimation, and six ancillas are needed to implement the controlled Q operator. For conditional value at risk one more ancilla is needed for the comparison to the level 1 as discussed herein.

Once the shift and twist distributions are loaded into the quantum computer, using the circuit shown in FIGS. 13a and 13b, apply the operator F to create the state defined in equation (4).

The quantum estimation of risk is compared to the exact 95% value at risk level of $0.288. When taking into account the mapping, this classical value at risk corresponds to 0.093, shown by the vertical line in FIG. 14, which also shows that the quantum estimation of risk rapidly approaches this value as m is increased.

Figure 14:
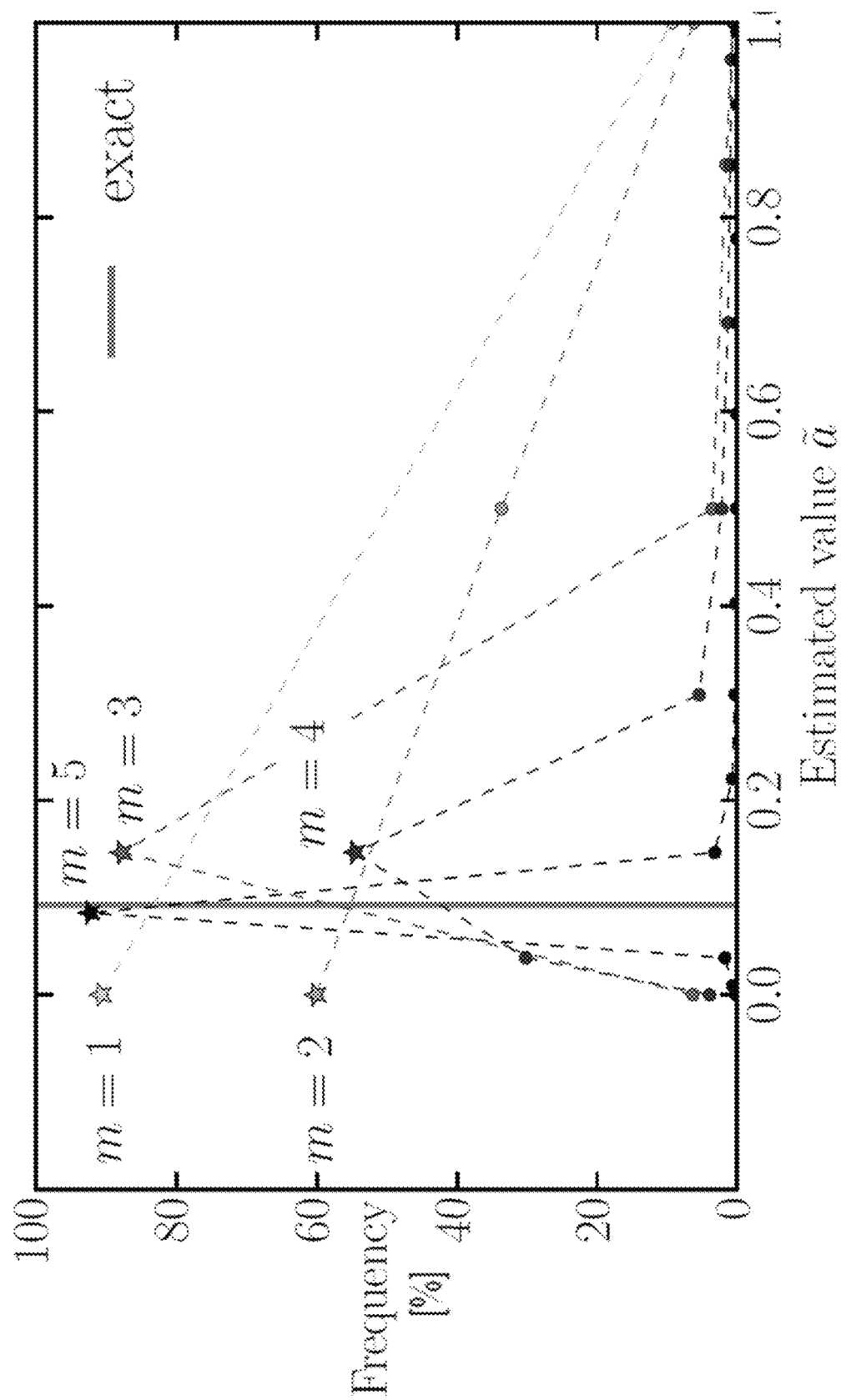
FIG. 14 is an example representation of estimating value at risk through a simulation of a quantum computer, according to one or more example embodiments of the present disclosure.

FIG. 14 shows value at risk estimated through a simulation of a perfect quantum computer. As the number of sample qubits m is increased the quantum estimated value at risk approaches the classical value indicated by the vertical solid line. The dashed lines are intended as guides to the eye. The stars indicate the most probable values.

With m=5 sample qubits the difference between the classical and quantum estimates is 9%. The numbers of single and two qubit gates needed to calculate value at risk approximately double each time a sample qubit is added, as set forth in the table below:

| | | all-to-all | | IBM Q 20 | | overhead | |
|---|---|---|---|---|---|---|---|
| m | M | $n_{1q}$ | $n_{cx}$ | $n_{1q}$ | $n_{cx}$ | $n_{1q}$ | $n_{cx}$ |
| 1 | 2 | 1'175 | 795 | 952 | 1'817 | 0.81 | 2.29 |
| 2 | 4 | 3'272 | 2'225 | 2'695 | 5'542 | 0.82 | 2.49 |
| 3 | 8 | 7'464 | 5'085 | 6'183 | 12'691 | 0.83 | 2.50 |
| 4 | 16 | 15'843 | 10'803 | 13'125 | 26'457 | 0.83 | 2.45 |
| 5 | 32 | 32'593 | 22'235 | 27'057 | 55'520 | 0.83 | 2.50 | which scales as O(M) with a resulting error of $O(M^{-1})$. Thus, the above table is a summary of the number of gates to estimate value at risk as function of m for a processor architecture featuring an all-to-all qubit connectivity and an architecture with a qubit connectivity corresponding to the IBM Q 20 chip with 20 qubits. Note that $n_{1q}$ and $n_{cx}$ are the number of single qubit and two qubit gates.

The connectivity of the IBM Q 20 chip increases the number of CNOT gates by a factor 2.5 when compared to a chip with all-to-all connectivity.

Turning to results from simulations of a noisy quantum computer, computing risk for the two asset portfolio needs a long circuit. However, it suffices for amplitude estimation to return the correct state with the highest probability, i.e. it is not needed that measurements yield this state with 100% probability. Simulations with errors are run to investigate how much imperfection can be tolerated before the correct state can no longer be identified. Two types of errors are considered, namely energy relaxation and cross-talk, where the latter is only considered for two-qubit gates (CNOT gates). This is likely a sufficient approximation to capture the leading error sources. Errors and gate times for single qubit gates are in general an order of magnitude lower than for two-qubit gates. Furthermore, the algorithm requires the same order of magnitude in the number of single and two-qubit gates, as indicated in the above table. Energy relaxation is simulated using a relaxation rate r such that after a time t each qubit has a probability 1−exp(−rt) of relaxing to |0⟩. The duration of the CNOT gates is set to 100 ns, assuming that the single qubit gates are done instantly and are thus exempt from errors. Qubit-qubit cross-talk is also included in the simulation by adding a ZZ error-term in the generator of the CNOT gate $$\exp\{-i\pi(ZX+\alpha ZZ)/4\}. \quad (20)$$

Typical cross-resonance CNOT gate rates are of the order of 5 MHz while cross-talk on IBM Q chips are of the order of −100 kHz. A reasonable value of a is thus estimated, i.e. the strength of the cross-talk, to be −2% and simulate its effect over the range [−3%, 0%].

The effect of these errors can be illustrated by computing the expected value of the portfolio. Because the distributions are symmetric around zero and mapped to the interval [0, 1], a value of 0.5 is expected, i.e. from one day to the next a change in the portfolio value is not expected. This simulation is run with m=2 sample qubits since this suffices to exactly estimate 0.5. The algorithm is successful if it manages to identify 0.5 with a probability greater than 50%.

With the error model, this is achieved for relaxation rates $r < 10^4 S^{-1}$ and cross-talk strength $|\alpha| < 1\%$, as represented herein (in FIGS. 15, 16a and 16b), despite the 4383 gates needed. A generous estimation of current hardware capabilities with $r=10^4 S^{-1}$ (loosely based on T1=100 μs) and α=−2%, shown as dashed lines in FIG. 15, indicates that this simulation may be possible in the near future as long as other error sources (such as measurement error and unitary errors resulting from improper gate calibrations) are kept under control.

Figure 15:
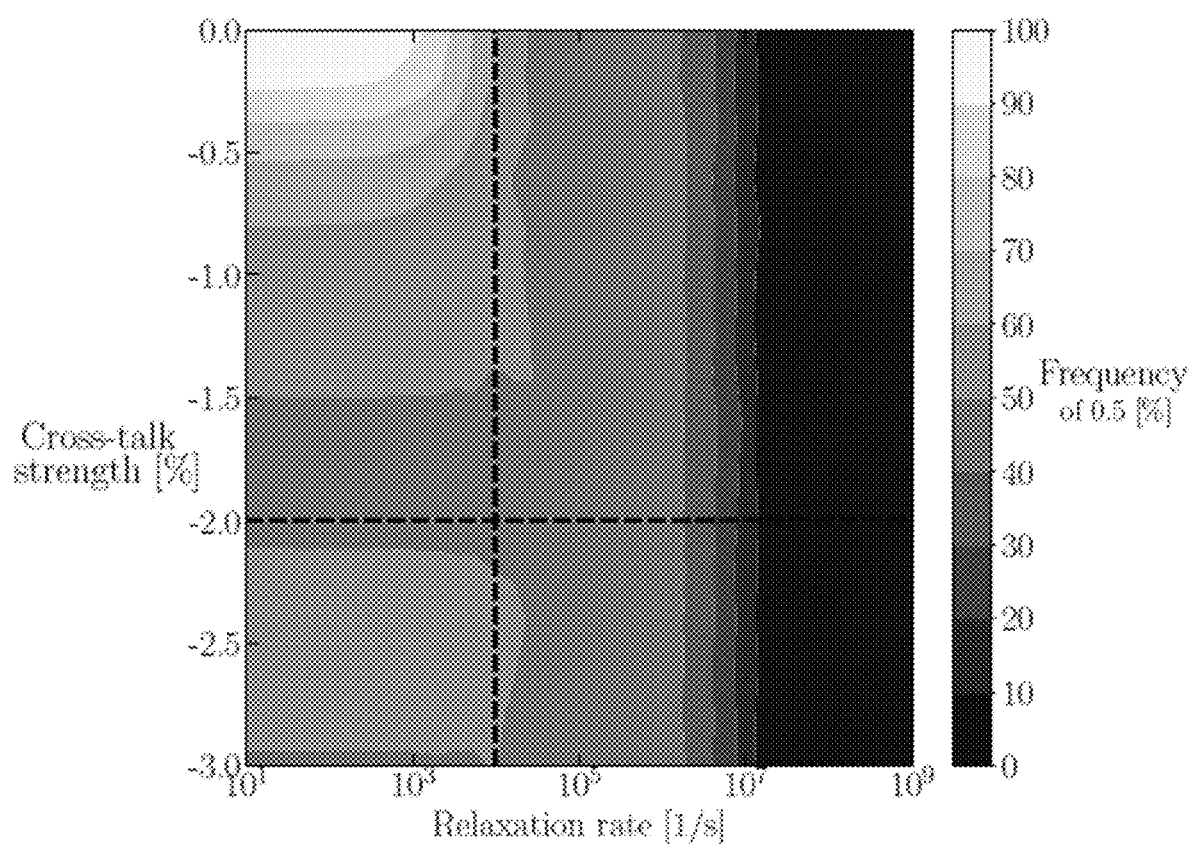
FIG. 15 is an example representation of how the probability of measuring risk decreases with increasing noise, according to one or more example embodiments of the present disclosure.
Figure 16A:
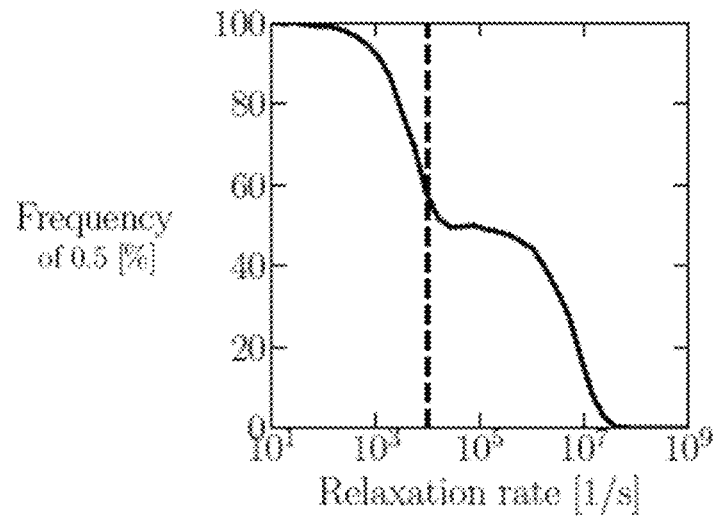
FIGS. 16a and 16b are example representations of how the probability of measuring risk decreases with increasing noise, for relaxation rate (FIG. 16a) and cross-talk strength (FIG. 16b) according to one or more example embodiments of the present disclosure.
Figure 16B:
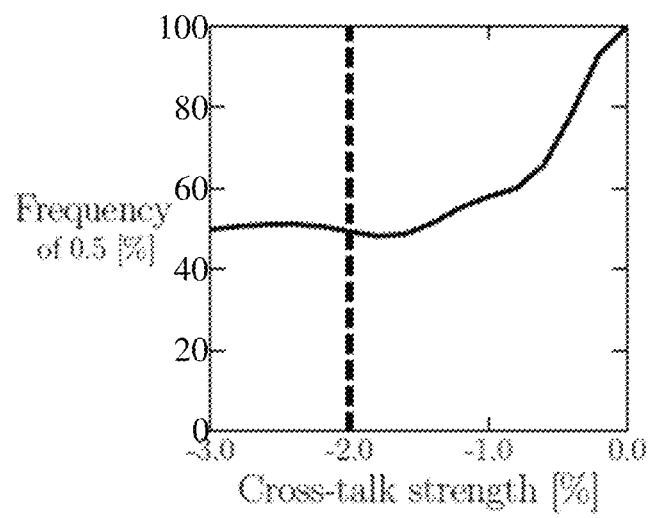

FIGS. 15, 16a and 16b show results from noisy simulation for estimating the expected value of the two asset portfolio using two evaluation qubits. The perfect simulation returns 0.5 with 100%. As can be seen, the probability of measuring 0.5 decreases with increasing noise; FIG. 15 shows the results for both increasing cross-talk and increasing relaxation rate, FIG. 16a shows the marginal result when only varying the relaxation rate, and FIG. 16b shows the marginal result for different cross-talk strengths. The dashed lines indicate the estimate state of the currently available hardware.

As can be seen, described herein is a concrete instantiation of quantum circuits for risk analysis, e.g. for portfolios of financial assets. The technology provides significant (quadratic) speedup relative to Monte Carlo simulations. Given an optimal circuit depth, convergence can possibly approach near real-time approximations. The technology is very flexible and straightforward to extend to other risk measures such as semi-variance.

A system can comprise an uncertainty modeling component 108 (FIG. 1) that models uncertainty of one or more random variables to provide a first quantum sub-circuit 114 by mapping the one or more variables to quantum states represented by a selected number of qubits using quantum gates. The system can further comprise a risk metric encoding component 110 that encodes (e.g., via component 112) a risk metric into a second quantum sub-circuit 114, the second quantum sub-circuit comprising a first ancilla qubit and Y-rotations controlled by one or more other qubits. The system can further comprise an amplitude estimation component 106 that performs amplitude estimation based on the first sub-circuit and the second sub-circuit to extract a probability value corresponding to the risk metric, wherein the probability value represents a probability of measuring a one state in the ancilla qubit. The risk metric encoding component can approximate the second sub-circuit using multi-controlled qubit rotations with rotation angles corresponding to polynomials to determine the risk metric as an expected value. The risk metric encoding component can approximate the second sub-circuit using multi-controlled qubit rotations with rotation angles corresponding to polynomials to determine the risk metric as a variance value. The risk metric encoding component can encode the risk metric to determine a value at risk quantity. The risk metric encoding component can approximate the second sub-circuit using multi-controlled qubit rotations with rotation angles corresponding to polynomials.

The risk metric encoding component can encode the risk metric to determine a conditional value at risk quantity. The risk metric encoding component can approximate the second sub-circuit using multi-controlled qubit rotations with rotation angles corresponding to polynomials.

A quantum sub-circuit construction component 112 can construct the second quantum sub-circuit by determining a polynomial function, and mapping the polynomial function to quantum sub-circuit Y-rotation components.

Figure 17:
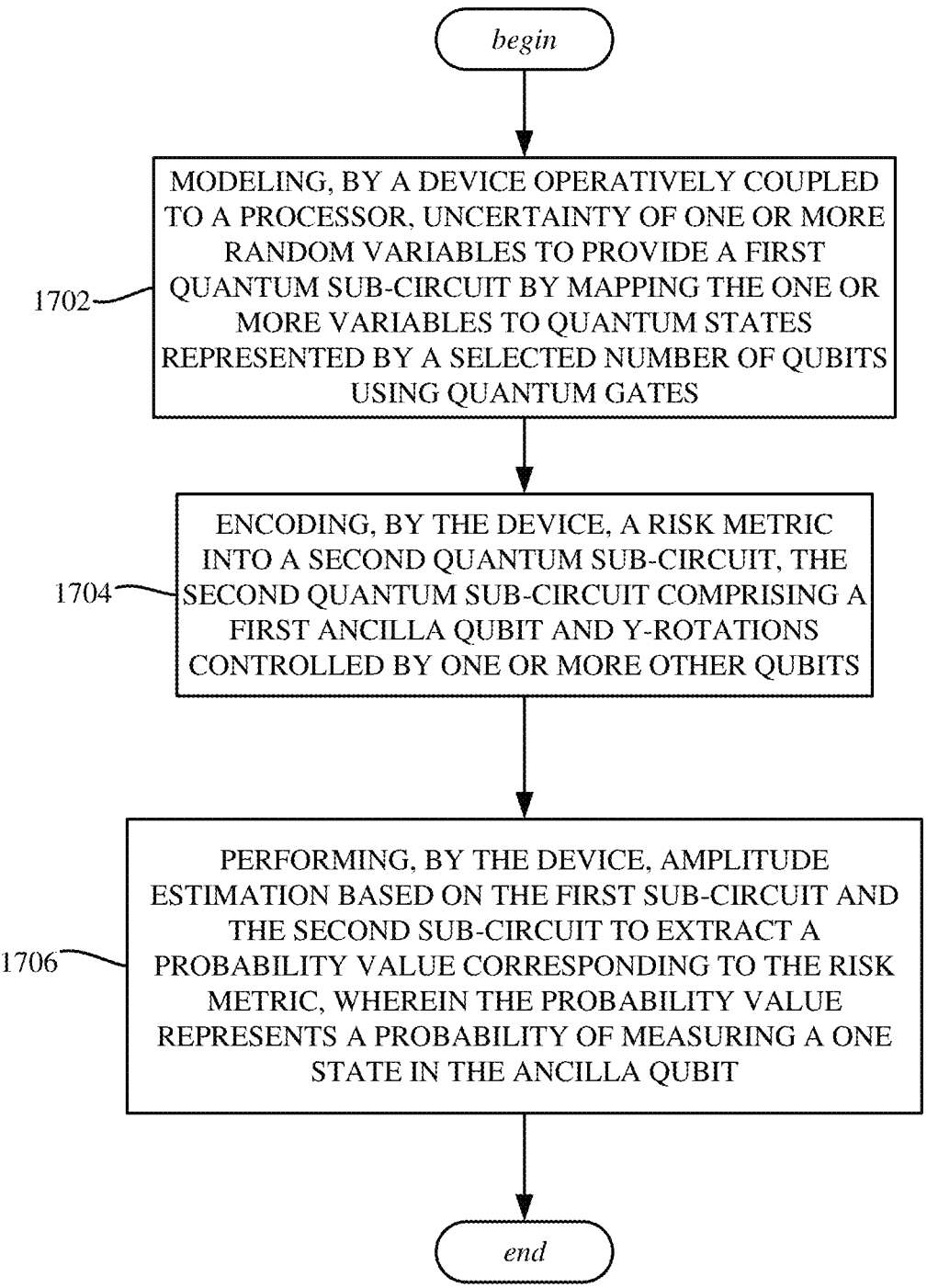
FIG. 17 illustrates an example, non-limiting system of components that facilitate estimating risk using quantum circuits, in accordance with one or more embodiments described herein.

FIG. 17 is a representation of a computer implemented method that can be used to implement quantum risk analysis as described herein. Note that FIG. 17 can be implemented as system components as described above, and/or operations of a computer program product.

Operation 1702 represents modeling, by a device operatively coupled to a processor, uncertainty of one or more random variables to provide a first quantum sub-circuit by mapping the one or more variables to quantum states represented by a selected number of qubits using quantum gates. Operation 1704 represents encoding, by the device, a risk metric into a second quantum sub-circuit, the second quantum sub-circuit comprising a first ancilla qubit and Y-rotations controlled by one or more other qubits. Operation 1706 represents performing, by the device, amplitude estimation based on the first sub-circuit and the second sub-circuit to extract a probability value corresponding to the risk metric, wherein the probability value represents a probability of measuring a one state in the ancilla qubit.

Aspects can comprise computing an expected value or a variance value based on the probability value. The risk metric can comprise a value at risk quantity at a probability level, and aspects can comprise performing a bisection search to obtain a smallest level at which the probability value obtained via amplitude estimation is above a given threshold, wherein the value at risk quantity corresponds to the smallest level.

The ancilla qubit can comprise a first ancilla qubit, the risk metric can comprise a conditional value at risk quantity, and further aspects can comprise estimating the conditional value at risk quantity by adding a second ancilla qubit to the second sub-circuit, and controlling an operator that acts on the other qubits and the second ancilla qubit.

Further aspects can comprise determining a polynomial function, with multi-controlled qubit rotations with rotation angles corresponding to the polynomial function, and mapping the polynomial function to the second quantum sub-circuit.

Constructing the second quantum sub-circuit can comprise determining a degree of the polynomial function based on a desired convergence rate, or determining a degree of the polynomial function based on a desired circuit depth.

A computer program product facilitating estimating a risk analysis result for a risk analysis metric can be provided, the computer program product comprising a computer readable storage medium having program instructions embodied therewith, the program instructions executable by a processor to cause the processor to model uncertainty of one or more random variables to provide a first quantum sub-circuit by mapping the one or more variables to quantum states represented by a selected number of qubits using quantum gates. Other instructions can cause the processor to encode a risk metric into a second quantum sub-circuit, the second quantum sub-circuit comprising a first ancilla qubit and Y-rotations controlled by one or more other qubits, and perform amplitude estimation based on the first sub-circuit and the second sub-circuit to extract a probability value corresponding to the risk metric, wherein the probability value represents a probability of measuring a one state in the ancilla qubit.

The risk metric can comprise a value at risk quantity at a probability level, and the program instructions can be further executable by the processor to cause the processor to determine the risk metric based on the probability value by performing a bisection search to obtain a smallest level at which the probability value obtained via amplitude estimation is above a given threshold, wherein the value at risk quantity corresponds to the smallest level.

The ancilla qubit can comprise a first ancilla qubit and the risk metric can comprise a conditional value at risk quantity at a probability level. Further program instructions can cause the processor to estimate the conditional value at risk quantity by adding a second ancilla qubit to the second sub-circuit, and controlling an operator that acts on the other qubits and the second ancilla qubit.

Further program instructions can cause the processor to construct the second quantum sub-circuit by determining a polynomial function, with multi-controlled qubit rotations with rotation angles corresponding to the polynomial function, and mapping the polynomial function to the second quantum sub-circuit.

Figure 18:
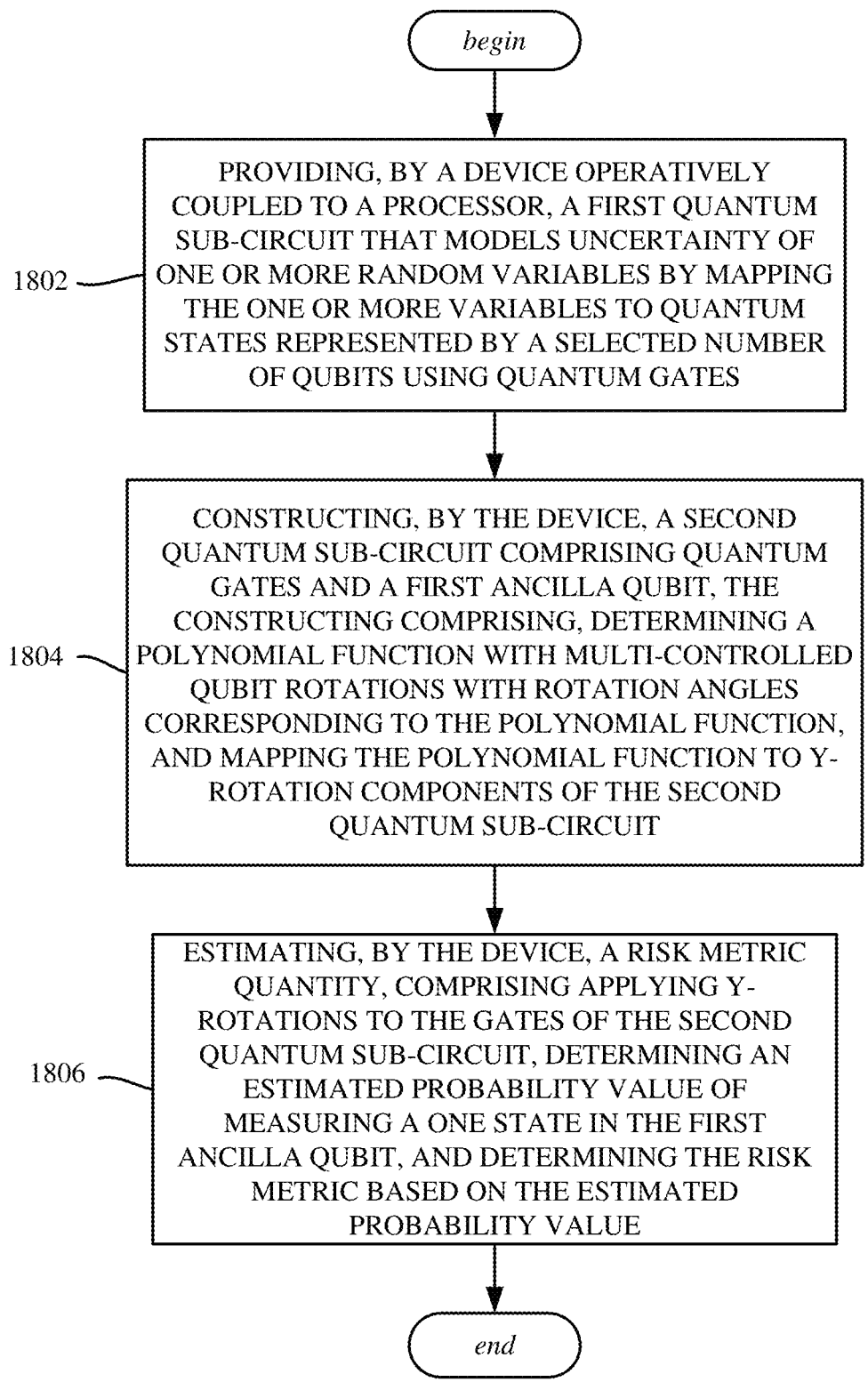
FIG. 18 illustrates a flow diagram of an example, non-limiting computer-implemented method facilitating estimating risk using quantum circuits in accordance with one or more embodiments described herein.

Other aspects, exemplified as operations in FIG. 18, can comprise providing, (operation 1802) by a device operatively coupled to a processor, a first quantum sub-circuit that models uncertainty of one or more random variables by mapping the one or more variables to quantum states represented by a selected number of qubits using quantum gates, and constructing (operation 1804), by the device, a second quantum sub-circuit comprising quantum gates and a first ancilla qubit, the constructing comprising, determining a polynomial function with multi-controlled qubit rotations with rotation angles corresponding to the polynomial function, and mapping the polynomial function to Y-rotation components of the second quantum sub-circuit. Other aspects, represented as operation 1806, can comprise estimating, by the device, a risk metric quantity, comprising applying Y-rotations to the gates of the second quantum sub-circuit, determining an estimated probability value of measuring a one state in the first ancilla qubit, and determining the risk metric based on the estimated probability value.

Note that FIG. 18 can correspond to operations of system components as described herein, as well as a computer program product with instructions that correspond to the example operations when executed.

For example, a computer program product facilitating estimating a risk analysis quantity for a risk analysis metric can be provided. The computer program product can comprise a computer readable storage medium having program instructions embodied therewith, the program instructions executable by a processor to cause the processor to provide a first quantum sub-circuit that models uncertainty of one or more random variables by mapping the one or more variables to quantum states represented by a selected number of qubits using quantum gates, construct a second quantum sub-circuit comprising quantum gates and a first ancilla qubit, comprising determining a polynomial function with multi-controlled qubit rotations with rotation angles corresponding to the polynomial function, and mapping the polynomial function to Y-rotation components of the second quantum sub-circuit, and estimate a risk metric quantity, comprising applying Y-rotations to the quantum gates of the second quantum sub-circuit, determining an estimated probability value of measuring a one state in the first ancilla qubit, and determining the risk metric based on the estimated probability value.

Further program instructions can cause the processor to estimate the risk metric quantity based on the estimated probability value by performing a bisection search to obtain a smallest level at which the probability value obtained via amplitude estimation is above a given threshold, wherein a value at risk quantity corresponds to the smallest level.

Further program instructions can cause the processor to construct the second quantum sub-circuit by adding a second ancilla qubit to the second quantum sub-circuit, and to estimate the risk metric quantity by controlling, by the first ancilla qubit, an operator that acts on the other qubits and the second ancilla qubit.

Figure 19:
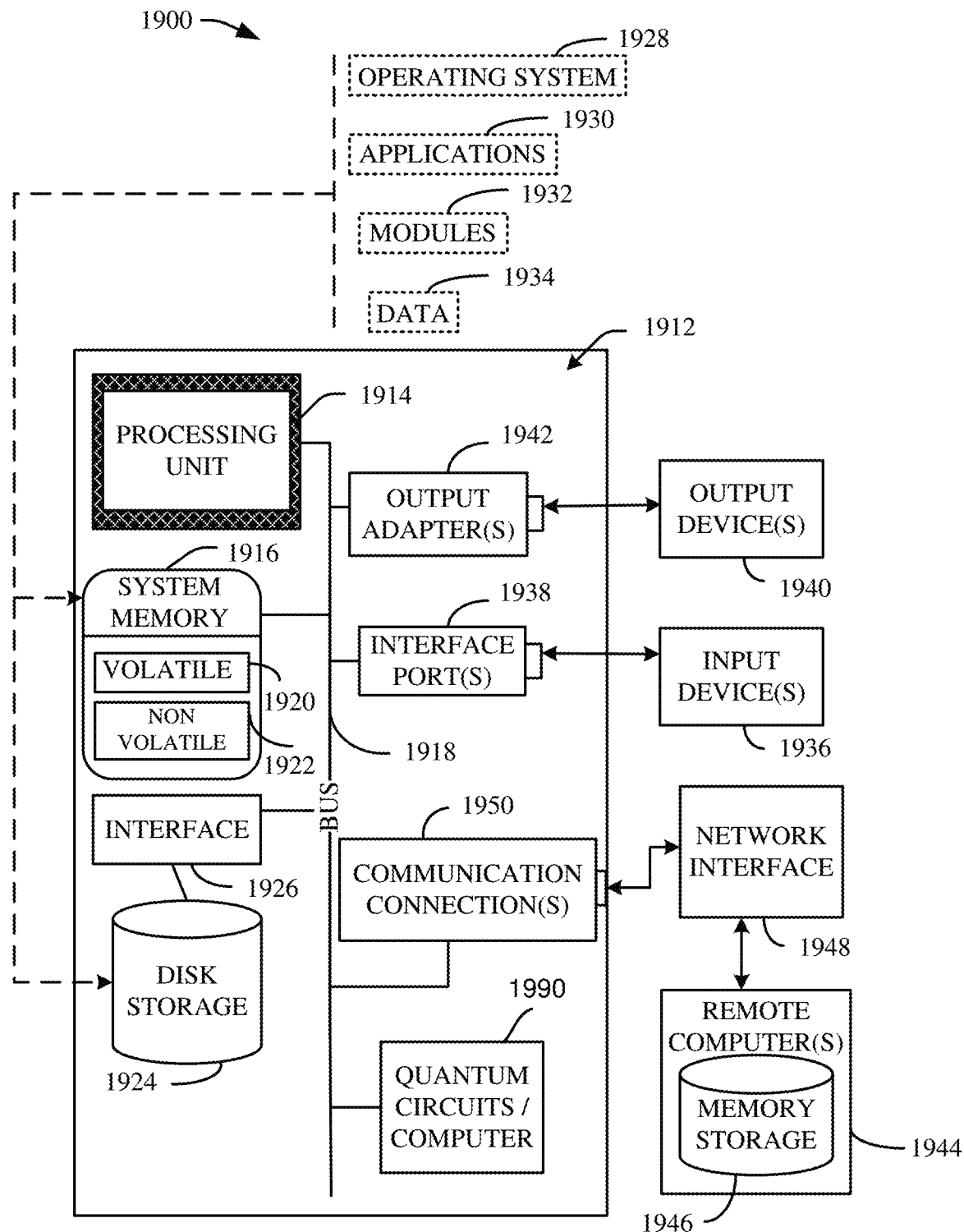
FIG. 19 illustrates a block diagram of an example, non-limiting operating environment in which one or more embodiments described herein can be facilitated.

In order to provide a context for the various aspects of the disclosed subject matter, FIG. 19 as well as the following discussion are intended to provide a general description of a suitable environment in which the various aspects of the disclosed subject matter can be implemented. FIG. 19 illustrates a block diagram of an example, non-limiting operating environment in which one or more embodiments described herein can be facilitated. Repetitive description of like elements employed in other embodiments described herein is omitted for sake of brevity.

With reference to FIG. 19, a suitable operating environment 1900 for implementing various aspects of this disclosure can also include a computer 1912. The computer 1912 can also include a processing unit 1914, a system memory 1916, and a system bus 1918. The system bus 1918 couples system components including, but not limited to, the system memory 1916 to the processing unit 1914. The processing unit 1914 can be any of various available processors. Dual microprocessors and other multiprocessor architectures also can be employed as the processing unit 1914. The system bus 1918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1916 can also include volatile memory 1920 and nonvolatile memory 1922. The basic input/output system (BIOS), containing the basic routines to transfer information between elements within the computer 1912, such as during start-up, is stored in nonvolatile memory 1922. Computer 1912 can also include removable/non-removable, volatile/non-volatile computer storage media. FIG. 19 illustrates, for example, a disk storage 1924. Disk storage 1924 can also include, but is not limited to, devices like a magnetic disk drive, floppy disk drive, tape drive, Jaz drive, Zip drive, LS-100 drive, flash memory card, or memory stick. The disk storage 1924 also can include storage media separately or in combination with other storage media. To facilitate connection of the disk storage 1924 to the system bus 1918, a removable or non-removable interface is typically used, such as interface 1926. FIG. 19 also depicts software that acts as an intermediary between users and the basic computer resources described in the suitable operating environment 1900. Such software can also include, for example, an operating system 1928. Operating system 1928, which can be stored on disk storage 1924, acts to control and allocate resources of the computer 1912.

System applications 1930 take advantage of the management of resources by operating system 1928 through program modules 1932 and program data 1934, e.g., stored either in system memory 1916 or on disk storage 1924. It is to be appreciated that this disclosure can be implemented with various operating systems or combinations of operating systems. A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port can be used to provide input to computer 1912, and to output information from computer 1912 to an output device 1940. Output adapter 1942 is provided to illustrate that there are some output devices 1940 like monitors, speakers, and printers, among other output devices 1940, which require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a computer, a server, a router, a network PC, a workstation, a microprocessor based appliance, a peer device or other common network node and the like, and typically can also include many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1950 refers to the hardware/ software employed to connect the network interface 1948 to the system bus 1918. While communication connection 1950 is shown for illustrative clarity inside computer 1912, it can also be external to computer 1912. The hardware/ software for connection to the network interface 1948 can also include, for exemplary purposes only, internal and external technologies such as, modems including regular telephone grade modems, cable modems and DSL modems, ISDN adapters, and Ethernet cards.

FIG. 19 also shows a represents quantum circuits/a quantum computer 1990; this can correspond to the quantum circuits 114 of FIG. 1. Although the quantum circuits/ quantum computer 1990 is shown as coupled to the processing unit 1914 via the bus 1918, it is understood that any suitable interface can be used to couple the quantum circuits/ quantum computer 1990 to the processing unit 1914.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM).

Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising,
    an uncertainty modeling component that models uncertainty of one or more random variables to provide a first quantum sub-circuit by mapping the one or more variables to quantum states represented by a selected number of qubits using quantum gates;
    a risk metric encoding component that encodes a risk metric into a second quantum sub-circuit, the second quantum sub-circuit comprising a first ancilla qubit and Y-rotations controlled by one or more other qubits; and
    an amplitude estimation component that performs amplitude estimation based on the first sub-circuit and the second sub-circuit to extract a probability value corresponding to the risk metric, wherein the probability value represents a probability of measuring a one state in the first ancilla qubit.

2. The system of claim 1, wherein the risk metric encoding component approximates the second sub-circuit using multi-controlled qubit rotations with rotation angles corresponding to polynomials to determine the risk metric as an expected value.

3. The system of claim 1, wherein the risk metric encoding component approximates the second sub-circuit using multi-controlled qubit rotations with rotation angles corresponding to polynomials to determine the risk metric as a variance value.

4. The system of claim 1, wherein the risk metric encoding component encodes the risk metric to determine a value at risk quantity.

5. The system of claim 4, wherein the risk metric encoding component approximates the second sub-circuit using multi-controlled qubit rotations with rotation angles corresponding to polynomials.

6. The system of claim 1, wherein the risk metric encoding component encodes the risk metric to determine a conditional value at risk quantity.

7. The system of claim 6, wherein the risk metric encoding component approximates the second sub-circuit using multi-controlled qubit rotations with rotation angles corresponding to polynomials.

8. The system of claim 3, further comprising a quantum sub-circuit construction component that constructs the second quantum sub-circuit by determining a polynomial function, and mapping the polynomial function to quantum sub-circuit Y-rotation components.

9. A computer-implemented method comprising,
    modeling, by a device operatively coupled to a processor, uncertainty of one or more random variables to provide a first quantum sub-circuit by mapping the one or more variables to quantum states represented by a selected number of qubits using quantum gates;
    encoding, by the device, a risk metric into a second quantum sub-circuit, the second quantum sub-circuit comprising a first ancilla qubit and Y-rotations controlled by one or more other qubits; and
    performing, by the device, amplitude estimation based on the first sub-circuit and the second sub-circuit to extract a probability value corresponding to the risk metric, wherein the probability value represents a probability of measuring a one state in the first ancilla qubit.

10. The computer-implemented method of claim 9, further comprising, computing an expected value or a variance value based on the probability value.

11. The computer-implemented method of claim 9, wherein the risk metric comprises a value at risk quantity at a probability level, and further comprising, performing a bisection search to obtain a smallest level at which the probability value obtained via amplitude estimation is above a given threshold, wherein the value at risk quantity corresponds to the smallest level.

12. The computer-implemented method of claim 11, wherein the ancilla qubit comprises a first ancilla qubit, wherein the risk metric comprises a conditional value at risk quantity, and further comprising, estimating the conditional value at risk quantity by adding a second ancilla qubit to the second sub-circuit, and controlling an operator that acts on the other qubits and the second ancilla qubit.

13. The computer-implemented method of claim 9, further comprising, determining a polynomial function, with multi-controlled qubit rotations with rotation angles corresponding to the polynomial function, and mapping the polynomial function to the second quantum sub-circuit.

14. The computer-implemented method of claim 13, wherein the constructing the second quantum sub-circuit comprises determining a degree of the polynomial function based on a desired convergence rate.

15. The computer-implemented method of claim 13, wherein the constructing the second quantum sub-circuit comprises determining a degree of the polynomial function based on a desired circuit depth.

16. A computer program product facilitating estimating a risk analysis result for a risk analysis metric, the computer program product comprising a computer readable storage medium having program instructions embodied therewith, the program instructions executable by a processor to cause the processor to:
model uncertainty of one or more random variables to provide a first quantum sub-circuit by mapping the one or more variables to quantum states represented by a selected number of qubits using quantum gates;
encode a risk metric into a second quantum sub-circuit, the second quantum sub-circuit comprising a first ancilla qubit and Y-rotations controlled by one or more other qubits; and
perform amplitude estimation based on the first sub-circuit and the second sub-circuit to extract a probability value corresponding to the risk metric, wherein the probability value represents a probability of measuring a one state in the first ancilla qubit.

17. The computer program product of claim 16, wherein the risk metric comprises a value at risk quantity at a probability level, and wherein the program instructions are further executable by the processor to cause the processor to determine the risk metric based on the probability value by performing a bisection search to obtain a smallest level at which the probability value obtained via amplitude estimation is above a given threshold, wherein the value at risk quantity corresponds to the smallest level.

18. The computer program product of claim 16, wherein the ancilla qubit comprises a first ancilla qubit, wherein the risk metric comprises a conditional value at risk quantity at a probability level, and wherein the program instructions are further executable by the processor to cause the processor to estimate the conditional value at risk quantity by adding a second ancilla qubit to the second sub-circuit, and controlling an operator that acts on the other qubits and the second ancilla qubit.

19. The computer program product of claim 16, wherein the program instructions are further executable by the processor to cause the processor to construct the second quantum sub-circuit by determining a polynomial function, with multi-controlled qubit rotations with rotation angles corresponding to the polynomial function, and mapping the polynomial function to the second quantum sub-circuit.

20. A computer-implemented method, comprising:
providing, by a device operatively coupled to a processor, a first quantum sub-circuit that models uncertainty of one or more random variables by mapping the one or more variables to quantum states represented by a selected number of qubits using quantum gates;
constructing, by the device, a second quantum sub-circuit comprising quantum gates and a first ancilla qubit, the constructing comprising, determining a polynomial function with multi-controlled qubit rotations with rotation angles corresponding to the polynomial function, and mapping the polynomial function to Y-rotation components of the second quantum sub-circuit; and
estimating, by the device, a risk metric quantity, comprising applying Y-rotations to the gates of the second quantum sub-circuit, determining an estimated probability value of measuring a one state in the first ancilla qubit, and determining the risk metric based on the estimated probability value.

21. The computer-implemented method of claim 20, wherein the estimating the risk metric quantity based on the estimated probability value further comprises performing a bisection search to obtain a smallest level at which the probability value obtained via amplitude estimation is above a given threshold, wherein a value at risk quantity corresponds to the smallest level.

22. The computer-implemented method of claim 21, wherein the constructing the quantum sub-circuit further comprises adding a second ancilla qubit to the second quantum sub-circuit, and wherein the estimating the risk metric quantity further comprises controlling, by the first ancilla qubit, an operator that acts on the other qubits and the second ancilla qubit.

23. A computer program product facilitating estimating a risk analysis quantity for a risk analysis metric, the computer program product comprising a computer readable storage medium having program instructions embodied therewith, the program instructions executable by a processor to cause the processor to:
provide a first quantum sub-circuit that models uncertainty of one or more random variables by mapping the one or more variables to quantum states represented by a selected number of qubits using quantum gates;
construct a second quantum sub-circuit comprising quantum gates and a first ancilla qubit, comprising determining a polynomial function with multi-controlled qubit rotations with rotation angles corresponding to the polynomial function, and mapping the polynomial function to Y-rotation components of the second quantum sub-circuit; and
estimate a risk metric quantity, comprising applying Y-rotations to the quantum gates of the second quantum sub-circuit, determining an estimated probability value of measuring a one state in the first ancilla qubit, and determining the risk metric based on the estimated probability value.

24. A computer program product of claim 23, wherein the program instructions are further executable by the processor to estimate the risk metric quantity based on the estimated probability value by performing a bisection search to obtain a smallest level at which the probability value obtained via amplitude estimation is above a given threshold, wherein a value at risk quantity corresponds to the smallest level.

25. The computer program product of claim 24, wherein the program instructions are further executable by the processor to construct the second quantum sub-circuit by adding a second ancilla qubit to the second quantum sub-circuit, and to estimate the risk metric quantity by controlling, by the first ancilla qubit, an operator that acts on the other qubits and the second ancilla qubit.

* * * * *